United States Patent [19]

Wical

[11] Patent Number: 5,953,718
[45] Date of Patent: Sep. 14, 1999

[54] RESEARCH MODE FOR A KNOWLEDGE BASE SEARCH AND RETRIEVAL SYSTEM

[75] Inventor: Kelly Wical, Hastings, Minn.

[73] Assignee: Oracle Corporation, Redwood Shores, Calif.

[21] Appl. No.: 08/967,774

[22] Filed: Nov. 12, 1997

[51] Int. Cl.⁶ .................................................. G06F 17/30
[52] U.S. Cl. ...................... 707/5; 707/1; 707/2; 707/3; 707/4; 707/6; 707/7; 707/101; 707/104
[58] Field of Search ................................... 707/1–7, 104, 707/101; 704/1, 10; 706/45; 600/509, 301; 40/38

[56] References Cited

U.S. PATENT DOCUMENTS

| | | | |
|---|---|---|---|
| 4,985,697 | 1/1991 | Boulton | 340/750 |
| 5,167,011 | 11/1992 | Priest | 395/54 |
| 5,182,708 | 1/1993 | Ejiri | 364/419 |
| 5,257,185 | 10/1993 | Farley et al. | 364/419.19 |
| 5,276,616 | 1/1994 | Kuga et al. | 364/419.08 |
| 5,369,763 | 11/1994 | Biles | 395/600 |
| 5,576,954 | 11/1996 | Driscoll | 707/105 |
| 5,625,767 | 4/1997 | Bartell et al. | 395/140 |
| 5,630,125 | 5/1997 | Zellweger | 395/614 |
| 5,659,742 | 8/1997 | Beattie | 707/104 |
| 5,717,914 | 2/1998 | Husick | 707/104 |
| 5,737,734 | 4/1998 | Schultz | 707/4 |

OTHER PUBLICATIONS

Cox, John "'Text–Analysis' Server to Simplify Queries", Communications Week, Apr. 19, 1993.
Hendry, et al. How People Use Softcopy Manuals: A Case Study©, pp. 221–224, ©0–7903–0482–9/91 IEEE.

*Primary Examiner*—Thomas G. Black
*Assistant Examiner*—Diane D. Mizrahi
*Attorney, Agent, or Firm*—Fliesler, Dubb, Meyer & Lovejoy, LLP

[57] ABSTRACT

A research mode in a search and retrieval system generates a research document that infers an answer to a query from multiple documents. The search and retrieval system includes point of view gists for documents to provide a synopsis for a corresponding document with a slant toward a topic. To generate a research document, the search and retrieval system processes a query to identify one or more topics related to the query, selects document themes relevant to the query, and then selects point of view gists, based on the document themes, that have a slant towards the topics related to the query. A knowledge base, which includes categories arranged hierarchically, is configured as a directed graph to links those categories having a lexical, semantic or usage association. Through use of the knowledge base, an expanded set of query terms are generated, and research documents are compiled that include point of view gists relevant to the expanded set of query terms. A content processing system, which identifies the themes for a document and classifies the document themes in categories of the knowledge base, is also disclosed.

16 Claims, 15 Drawing Sheets

FIG. 3

| Documents (Relevance Ranked) | Query Term₁: CIA | Query Term₂: South America | Query Term₃: Revolution | Theme₁: Bob Smith | Theme₂: X Agency | Theme₃: Bill Jones | Theme₄: Peru |
|---|---|---|---|---|---|---|---|
| Document₄₀₀ | X | X |   | X | X |   |   |
| Document₆₀₀ |   | X | X |   |   | X |   |
| Document₃₀₀ | X |   |   | X |   |   |   |
| Document₅₀₀ | X | X |   |   |   |   |   |
| Document₇₀₀ |   |   | X |   | X | X | X |
| Document₂₀₀ |   |   | X | X |   |   |   |
| Document₈₀₀ |   |   |   |   |   | X |   |
| Document₁₀₀ |   |   |   |   |   | X |   |

Internet

*Virtual Clerk*
 Concept Search
Knowledge Search
List Topics
Help

---

Found 15 Documents and 5 Categories

☆☆☆☆ Computer Networking (15)
    ☆ Internet CreditBureau, Incorporated (0)
    ☆ Internet Fax Server (0)
    ☆ Internet Productions, Incorporated (0)
    ☆ Internet Newbies (0)

FIG. 8B

Science and Technology (2380) | Communications (279) | Telecommunications Industry (90)

Computer Networking(15)

Electronic Mail (1)
    GE Networks (1)
    Internet Technology (2)
    Messaging (1)
    NBC Networks (3)
    Networks (1)

Documents About Computer Networking and Also:

| | | | |
|---|---|---|---|
| Colorado | 7/01/88 | Business Brief: Noted... | ☒ |
| Mexican | 8/19/88 | The Americas: Mexico's... | ☒ |
| NBC Officials | 7/05/88 | NBC Talks With European... | - New |
| State Agencies | 10/07/88 | Three Companies Win $180... | - |
| Television and Radio | 8/09/88 | NBC-TV Trying to Beat... | +1 ☒ |

See Also:

Computer Hardware Industry (56)
    Computer Industry (256)
    Computer Standards (1)
    Information Technology (9)
    Mathematics (4)

FIG. 9A-1

Internet

*Virtual Clerk*

Concept Search
Knowledge Search
List Topics
Help

Stocks

Found 152 Documents and 64 Categories

| | | |
|---|---|---|
| ☆☆☆ | Commerce and Trade | (42) |
| ☆☆ | Companies | (13) |
| ☆☆ | Financial Investments | (8) |
| ☆☆ | Investors | (5) |
| ☆☆ | Portfolios | (3) |
| ☆ | Pharmaceutical Industry | (5) |
| ☆ | Magazines | (1) |
| ☆ | Automotive Industry | (3) |
| ☆ | Mineralogy | (3) |
| ☆ | Computer Software Industry | (4) |
| ☆ | Stocks and Bonds | (2) |
| ☆ | Food and Drink Industry | (4) |
| ☆ | Petroleum Products Industry | (1) |
| ☆ | Television and Radio | (1) |
| ☆ | New York Life Insurance Company | (1) |
| ☆ | McGraw-Hill, Incorporated | (1) |
| ☆ | Banking Industry | (2) |
| ☆ | Industrial Goods Manufacturing | (2) |
| ☆ | Texaco, Incorporated | (1) |
| ☆ | Insurance Industry | (2) |
| ☆ | Lawyers | (1) |
| ☆ | Walt Disney Company | (1) |
| ☆ | CitiCorp | (1) |
| ☆ | Diversified Companies | (2) |
| ☆ | Buys | (1) |
| ☆ | Preferred Stocks | (2) |
| ☆ | Computer Hardware Industry | (2) |

FIG. 9A-2

☆ Dun & Bradstreet Corporation (1)
☆ Health-care Companies (1)
☆ Brokers (1)
☆ Personal Finance (1)
☆ Lawsuits (1)
☆ Leveraged Buy-outs (1)
☆ Itel Corporation (1)
☆ Computer Industry (2)
☆ Aviation (1)
☆ Plastic and Rubber (1)
☆ Hard Sciences (1)
☆ Rail Transportation (1)
☆ Financial Lending (1)
☆ Chrysler Corporation (1)
☆ Gillette (1)
☆ Drugs (1)
☆ Clothing (1)
☆ Brush Wellman, Incorporated (1)
☆ Taxes and Tariffs (1)
☆ Manufacturing (1)
☆ Japanese Companies (1)
☆ Airlines (1)
☆ Cinema (1)
☆ Construction Industry (1)
☆ Automotive Service and Repair (1)
☆ Retail Trade Industry (1)
☆ Dow Chemical Company (1)
☆ Real Estate (1)
☆ Consumer Electronics (1)
☆ Chemical Industry (1)
☆ Convenience Products Businesses (1)
☆ Shares Outstanding (1)
☆ American Brands, Incorporated (1)
☆ Motorola, Incorporated (1)
☆ Package Delivery Industry (1)
☆ Masco Corporation (1)

FIG. 9B

Business and Economics (5438) | Business and Industry (2889) | Corporate Practices (263)

Portfolios (4)

◻ Documents About Portfolios and Also:

| 🗂 Commerce and Trade | ◻ 11/16/88 | Money Managers With... | - |
| 🗂 Interest Rates | ◻ 8/24/88 | Your Money Matters: Many... | ▧ |
| 🗂 Investors | ◻ 10/10/88 | These Stocks Are a... | ▧ |
| 🗂 Securities | ◻ 7/14/88 | Fannie Mae Net Rose 97%... | ▧ |

FIG. 9C

Category: <u>Portfolios</u> regarding 'stocks'

Documents:

<u>Money Managers With Smaller Stocks Hold Performance Lead, Study Shows</u>

'For all managers, the typical stock portfolio showed a 14.1% gain in the first nine months of 1988, topping the 13% rise by Standard & Poor's Corp. 500-stock index, according to CDA Investment Technologies Inc., a Bethesda, Md., research firm that compiles performance data supplied by investment advisers.'

<u>These Stocks Are a Nightmare -- As S&P Climbs 21%, Some Battered Stocks Still Dash Dreams</u>

'Months ago, investors began bailing out of Genentech stock, and recently the rush for the door has been feverish; the stock is down 45% since Oct. 19.'

<u>Your Money Matters: Many Investment Strategies May Falter Because of Hidden Economic Assumptions</u>

RESEARCH MODE FOR A KNOWLEDGE BASE SEARCH AND RETRIEVAL SYSTEM

BACKGROUND OF THE INVENTION

1. Field of the Invention

The present invention is directed toward the field of search and retrieval systems, and more particularly to a knowledge based multi-document search and retrieval system.

2. Art Background

In general, search and retrieval systems permit a user to locate specific information from a repository of documents, such as articles, books, periodicals, etc. For example, a search and retrieval system may be utilized to locate specific medical journals from a large database that consists of a medical library. Typically, to locate the desired information, a user enters a "search string" or "search query." The search query consists of one or more words, or terms, composed by the user. In response to the query, some prior art search and retrieval systems match words of the search query to words in the repository of information to locate information. Additionally, boolean prior art search and retrieval systems permit a user to specify a logic function to connect the search terms, such as "stocks AND bonds", or "stocks OR bonds."

In response to a query, a word match based search and retrieval system parses the repository of information to locate a match by comparing the words of the query to words of documents in the repository. If there is an exact word match between the query and words of one or more documents, then the search and retrieval system identifies those documents. These types of prior art search and retrieval systems are thus extremely sensitive to the words selected for the query.

The terminology used in a query reflects each individual user's view of the topic for which information is sought. Thus, different users may select different query terms to search for the same information. For example, to locate information about financial securities, a first user may compose the query "stocks and bonds", and a second user may compose the query "equity and debt." For these two different queries, a word match based search and retrieval system would identify two different sets of documents (i.e., the first query would return all documents that have the words stocks and bonds and the second query would return all documents that contain the words equity and debt). Although both of these query terms seek to locate the same information, with a word search and retrieval system, different terms in the query generate different responses. Thus, the contents of the query, and subsequently the response from word based search and retrieval systems, is highly dependent upon how the user expresses the query term. Consequently, it is desirable to construct a search and retrieval system that is not highly dependent upon the exact words chosen for the query, but that generates a similar response for different queries that have similar meanings.

Prior art search and retrieval systems do not draw inferences about the true content of the document. If the search and retrieval system merely compares words in a document with words in a query, then the content of a document is not really being compared with the subject matter identified by the query term. For example, a restaurant review article may include words such as food quality, food presentation, service, etc., without expressly using the word restaurant because the topic, restaurant, may be inferred from the context of the article (e.g., the restaurant review article appeared in the dining section of a newspaper or travel magazine). For this example, a word comparison between a query term "restaurant" and the restaurant review article may not generate a match. Thus, although the main topic of the restaurant review article is "restaurant", the article would not be identified. Accordingly, it is desirable to infer topics from documents in a search and retrieval system in order to truly compare the content of documents with a query term.

SUMMARY OF THE INVENTION

A research mode in a search and retrieval system generates a research document that infers an answer to a query from multiple documents. The search and retrieval system includes point of view gists for a plurality of documents. A point of view gist provides a synopsis for a corresponding document with a slant toward a topic. To generate a research document, the search and retrieval system processes a query to identify one or more topics related to the query. The search and retrieval system selects point of view gists, from multiple documents, with a slant towards topics related to the query.

In one embodiment, the search and retrieval system uses themes of the repository documents to generate the research documents. The themes generally define the overall content of the documents. For this embodiment, to process a query, the search and retrieval system selects themes relevant to the query, and then selects documents that contain the themes selected. Specifically, the search and retrieval system infers an answer to the query from multiple documents by selecting the most relevant document and then selecting additional documents that match and extent the most relevant document to fully satisfy the query.

In one embodiment, the search and retrieval system utilizes a knowledge base with categories arranged hierarchically. The knowledge base includes a directed graph that links terminology having a lexical, semantic or usage association. Through use of the knowledge base, an expanded set of query terms are generated, and research documents are compiled that include point of view gists relevant to the expanded set of query terms.

In one embodiment, the search and retrieval system utilizes a content processing system to process the documents. Specifically, during document processing, the content processing system identifies the themes for a document, and classifies the documents, including themes identified for the documents, in categories of the knowledge base.

BRIEF DESCRIPTION OF THE DRAWINGS

FIG. 3 illustrates a working matrix for the example query.

FIG. 8b illustrates another example display an example display for the query "Internet."

FIG. 9a illustrates an example display of the search and retrieval system to the query "stocks."

FIG. 9b illustrates an example display in response to the selection to the category "portfolios" from the display shown in FIG. 9a.

FIG. 9c illustrates the display of point of view gists for the query examples shown in FIGS. 9a and 9b.

DETAILED DESCRIPTION OF THE PREFERRED EMBODIMENTS

Figure 1:
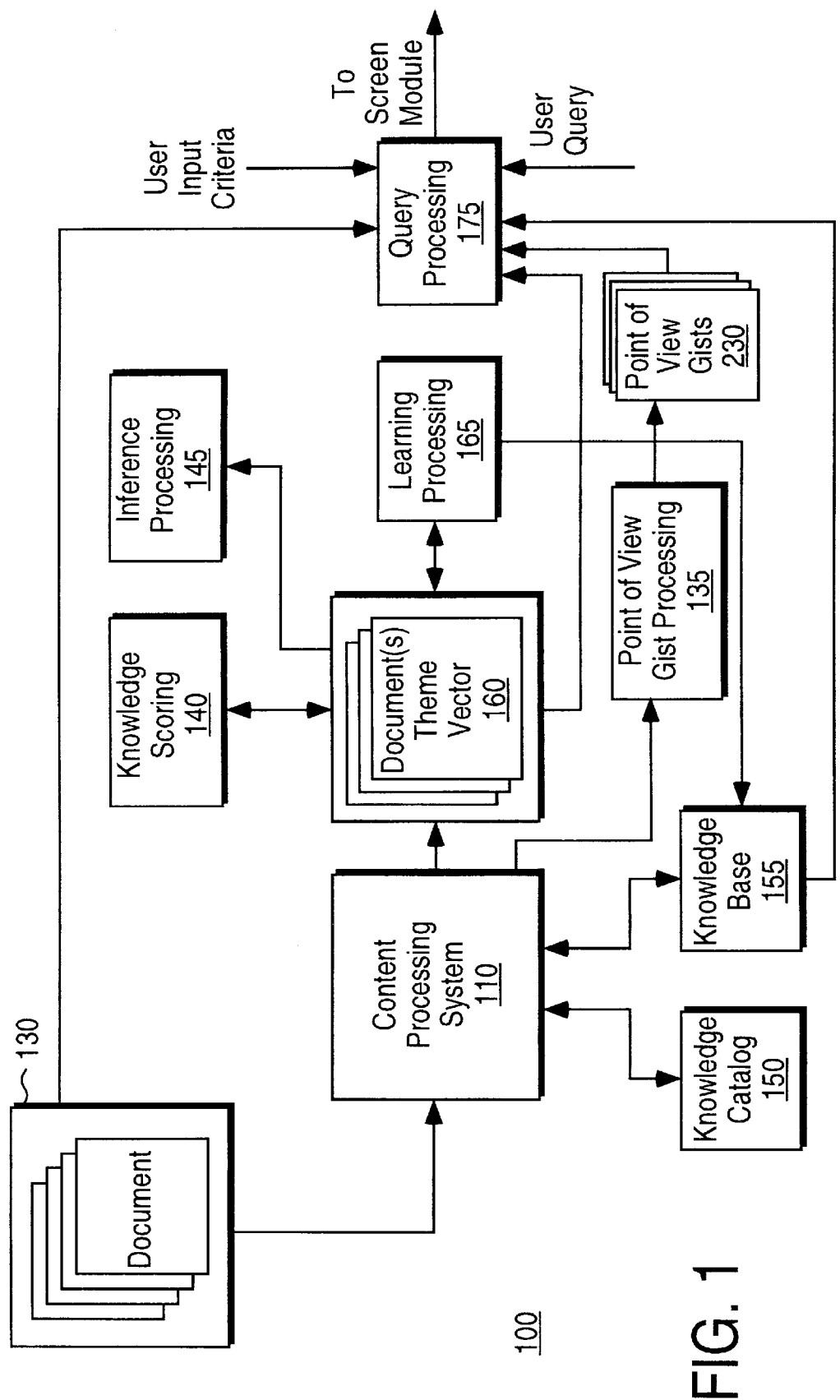
FIG. 1 is a block diagram illustrating one embodiment for the search and retrieval system of the present invention.

A Search and Retrieval Research Paradigm:

Typically, when performing research, the answer to a specific research inquiry is not found in a single document. Instead, responses to a research inquiry are typically found in multiple documents. For example, a query may seek information about the effects of pollution by European space stations. A single document that covers the effects of pollution by European space stations may not be available. However, a document about the effects of American space stations on space pollution and a document about European space stations may be available. The researcher, through use of both of these documents, must infer the effects of pollution caused by European space stations based on the document about pollution caused by American space stations as well as a specific document on European space stations. Thus, for this example, the response to the query was found in two documents. The search and retrieval system of the present invention identifies documents that collectively answer the search query by identifying a common denominator among the search query and themes in the documents.

The search and retrieval system of the present invention includes a research mode. In the research mode, the search and retrieval system emulates the paradigm of a researcher by extracting portions of different documents to infer an answer to the search query. When operating in the research mode, the search and retrieval system generates a document by extracting relevant portions of more than one document to satisfy all parts of an input query. This provides a customized document to satisfy all aspects of the search query. Typically, to generate a research document, several documents are used to extract the most relevant information. In one embodiment, the search and retrieval system utilizes themes of documents as pointers into point of view gists. The point of view gists for the corresponding themes are extracted to generate the research document. Thus, a research document includes point of view abstracts, or point of view gists, that are the most relevant paragraphs from the documents that convey the corresponding theme.

In general, each point of view gist is a synopsis or abstract that reflects the content of a document from a predetermined slant. Typically, a document contains several themes or topics, including sub-topics which relate to other topics, that constitute the content of the document. The point of view gist processing generates point of view gists based on the different themes or topics contained in a document. A user may view a point of view gist of a document that contains the topics of interest for the particular user. The point of view gists for documents may be generated prior to processing an input query, or it may be generated on the fly (e.g., after receiving the input query).

A Search and Retrieval System:

The search and retrieval system of the present invention utilizes a rich and comprehensive content processing system to accurately identify themes that define the content of the source material (e.g., documents). In response to a search query, the search and retrieval system identifies themes, and the documents classified for those themes. In addition, the search and retrieval system of the present invention draws inferences from the themes extracted from a document. For example, a document about wine, appearing in a wine club magazine, may include the words "vineyards", "Chardonnay", "barrel fermented", and "french oak", which are all words associated with wine. As described more fully below, if the article includes many content carrying words that relate to the making of wine, then the search and retrieval system infers that the main topic of the document is about wine, even though the word "wine" may only appear a few times, if at all, in the article. Consequently, by inferring topics from terminology of a document, and thereby identifying the content of a document, the search and retrieval system locates documents with the content that truly reflect the information sought by the user. In addition, the inferences of the search and retrieval system provide the user with a global view of the information sought by identifying topics related to the search query although not directly included in the search query.

The search and retrieval system of the present invention utilizes sense associations to identify related terms and concepts. In general, sense associations relate terminology to topics or categories based on contexts for which the term may potentially appear. In one embodiment, to implement the use of sense association in a search and retrieval system, a knowledge base is compiled. The knowledge base reflects the context of certain terminology by associating terms with categories based on the use of the terms in documents. For the above example about wine making, the term "barrel fermented" may be associated with the category "wines." A user, by processing documents in the content processing system described herein, may compile a knowledge base that associates terms of the documents with categories of a classification system to develop contextual associations for terminology.

FIG. 1 is a block diagram illustrating one embodiment for the search and retrieval system of the present invention. In general, the search and retrieval system 100 receives, as input, user queries, and processes queries to identify the relevant themes, and the documents classified for those themes. The search and retrieval system 100 is cataloged with one or more documents, labeled documents 130 on FIG. 1. The documents 130 may include a compilation of information from any source. For example, the documents 130 may be information stored on a computer system as computer readable text. Also, the documents 130 may be accessed via a network, and stored at one or more remote locations. The content of the documents 130 may include articles, books, periodicals, etc.

In one embodiment, the search and retrieval system 100 operates in conjunction with a content processing system 110. In general, the content processing system 110 analyzes the thematic, contextual, and stylistic aspects of the documents 130, and generates a document theme vector 160. The document theme vector 160 identifies themes for each individual document, as well as a theme strength corresponding to each theme. In addition to identifying document themes, the content processing system 110 attempts to classify each theme. Specifically, the content processing system 110 uses a classification criteria, which in one embodiment includes categories arranged hierarchically, to classify document themes in one or more categories. The classifications for document themes are identified in the document theme vector 160. As discussed more fully below, the document theme vector 160 is used to process user input queries.

In one embodiment, the content processing system 110 uses a knowledge catalog 150 to identify categories for the document themes. For this embodiment, the knowledge catalog 150 contains categories, arranged in a hierarchy, that reflect a world view of knowledge. Appendix A of U.S. patent application Ser. No. 08/454,745, inventor Kelly Wical, entitled "A Content Processing System for Discourse", filed May 31, 1995, which is herein expressly incorporated by reference, is an example of a knowledge catalog for use in classifying documents. Although the present invention is described in conjunction with a knowledge catalog used to classify documents, any classification criteria that identifies topics or categories may be used in conjunction with the present invention without deviating from the spirit or scope of the invention.

The search and retrieval system 100 utilizes a knowledge base, labeled 155 on FIG. 1. In general, the knowledge base 155 includes a hierarchy of categories and terminology, based on the arrangement of categories in the knowledge catalog 150, augmented to include contextual information (e.g., associations). In general the contextual information is learned from processing the documents, or is manually noted by linguists. In one embodiment, the knowledge base 155 may contain classification and contextual information based on processing and/or compilation of thousands of documents. The search and retrieval system 100 permits a user to subsequently augment the classification and contextual information through content processing of the documents input by the user. The contents, generation and use of the knowledge base 155 is described more fully below in section "The Knowledge Base."

The content processing system 110, used in conjunction with the search and retrieval system 100, is described more fully below in the section entitled "A Content Processing System." Although the present invention is described in conjunction with the content processing system 110 which analyzes documents to provide a rich and comprehensive thematic profile and classification of the documents, any content processing system that identifies topics to classify themes or terminology of documents may be used in conjunction with search and retrieval system 100 without deviating from the spirit or scope of the invention.

Figure 4:
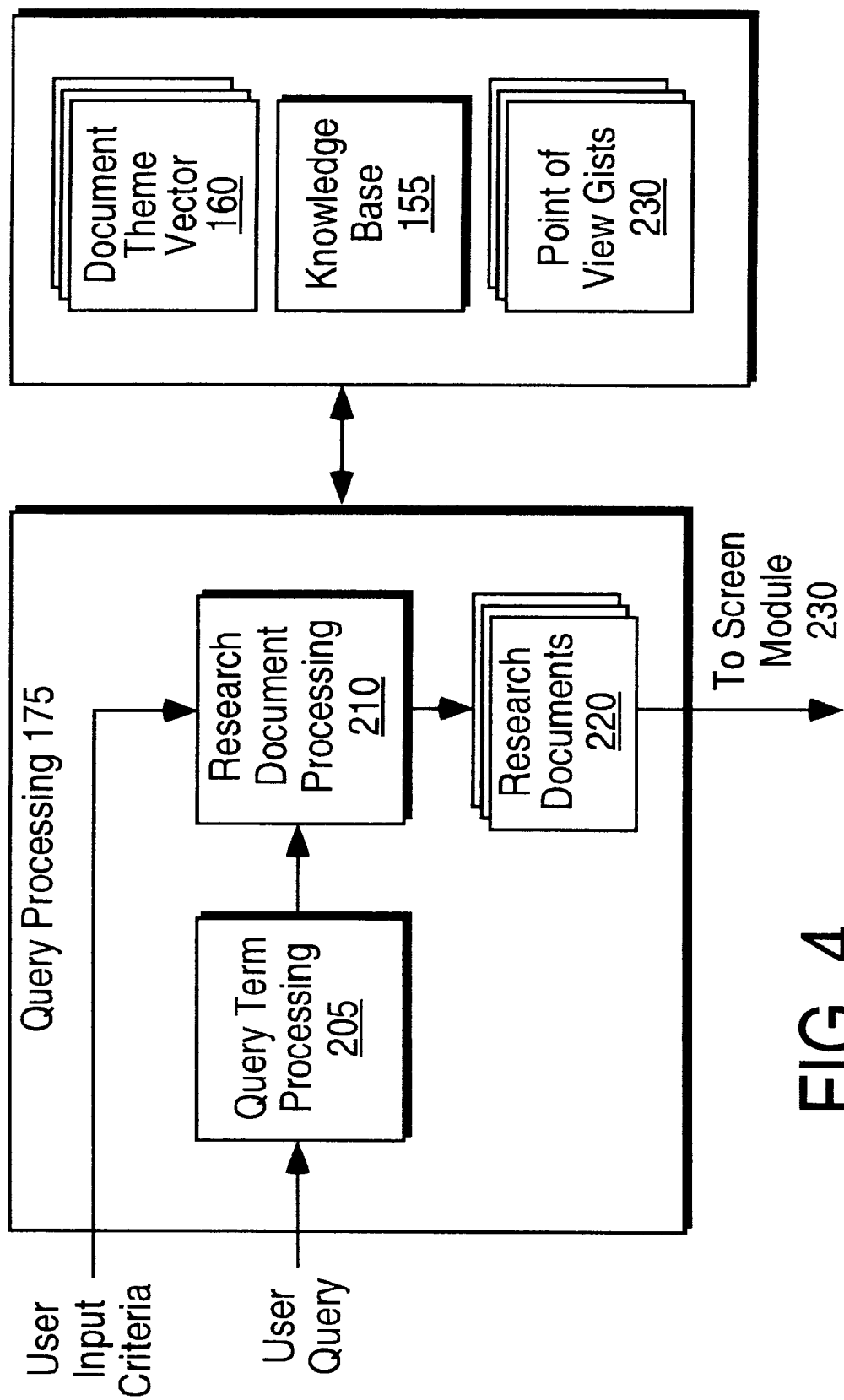
FIG. 4 is a block diagram illustrating one embodiment for query processing.

The search and retrieval system 100 contains point of view gist processing 135 to generate the point of view gists 230 (FIG. 4). To generate the different point of view gists, the search and retrieval system 100 utilizes the document theme vectors 160 that contain document themes. The document themes specify the overall content of the document. The point of view gist processing 135 utilizes the document theme vectors 160, including the document themes, to generate the point of view gists. In one embodiment, the point of view gists consist of one or more paragraphs from the document that include content relating to a document theme for which the point of view gist is based.

In one embodiment, the content processing system 110 analyzes paragraphs in the document to identify paragraph themes for each paragraph, and analyzes the document as a whole to identify the document themes. The point of view gist processing generates point of view gists for different document themes by relevance ranking paragraphs that contain a paragraph theme corresponding to the document theme. For a complete description of generating point of view gists, see U.S. patent application entitled "Point of Gists and Generic Gists in a Document Browsing System", Ser. No. 08/673,306, filed on Jun. 28, 1996, inventor Kelly Wical, which is herein expressly incorporated by reference.

As shown in FIG. 1, learning processing 165 accesses and updates (as designated by the double headed arrow) the document theme vector 160. In general, learning processing 165 identifies categories for terms/themes in the document theme vector 160 for which themes/terms were not previously classified. For example, the document theme vector 160 may include the term "Oracle 7." The term "Oracle 7", a proper noun, was not classified in the content processing system 110 due to insufficient data (e.g., the context of the term was not determined in that stage of processing). For this example, the learning system analyzes categories classified for documents that contain the term "Oracle 7." From this analysis, the learning processing 165 determines that the term "Oracle 7" relates to computer software, and more particularly to relational databases. After associating or learning a category for a term previously unclassified, the learning processing 165 updates the document theme vector 160 to include the newly learned categories. Accordingly, the learning processing 165 disambiguates the context of a term by assigning a category for terms and themes previously unclassified. U.S. patent application Ser. No. 08/655,957, inventors Kelly Wical and James Conklin, entitled "A Learning System For Classification Of Terminology", filed May 31, 1996, which is herein expressly incorporated by reference, discloses techniques for learning terminology in accordance with one embodiment for the learning processing 165. An overview for learning processing is contained below in the section entitled "A Learning System."

The search and retrieval system 100 further includes knowledge scoring 140 and inference processing 145 to further refine the contents of document theme vector 160. As discussed above, the document theme vector 160 includes a list of themes for a document to define the content of that document. Thus, the document theme vector 160 lists all of the themes for a corresponding document identified after the initial content processing. However, a document may have one or more associated themes that were not identified after the initial content processing stage. In one embodiment, the content processing system identifies themes from terminology used in the document. However, a document may have a theme without ever expressly stating words that connote the theme. For example, a restaurant review column may consist of words that are typically associated with a restaurant, such as food quality, meal presentation, service, etc. Although the central theme of the restaurant review column is restaurant, the column may not include the term "restaurant." For the reader of the original restaurant review column, the central theme of "restaurant" may be implied from the magazine or newspaper publication (e.g., the column appears in the restaurant review section of the paper, or in a food magazine.) The inference processing 145 infers themes even though terminology is not explicitly included in the document. For the example document on restaurant reviews, the inference processing 145 adds the theme "restaurants" to the document theme vector 160 for that document. Accordingly, the inference processing 145 infers categories based on terminology in the document.

Knowledge scoring 140, which also operates on the document theme vector 160, reassigns theme strengths based on the contextual relationship among themes identified for the document. For example, for the above example restaurant review document, the inference processing 145 inferred the category "dining and restaurants." In a subsequent process, the knowledge scoring 140 adjusts the theme strengths for "dining establishments" if several of the themes support the general topic of dining establishments. Accordingly, knowledge scoring 140 is an additional process that adjusts the theme strengths based on the relationships among previously identified themes for that document.

As shown in FIG. 1, the search and retrieval system 100 includes query processing 175. The query processing 175 receives, as input, user queries, and generates, as output, research documents. The query processing 175 accesses documents 130, document theme vector 160, knowledge base 155, and point of view gists 230 to formulate a response to the user query.

Table 1 is an example document theme vector 160.

TABLE 1

Document Theme Vector

| Document Themes | Theme Strength | Classification Category |
|---|---|---|
| Theme$_1$ | 190 | (category$_a$) |
| Theme$_2$ | 110 | None |
| Theme$_3$ | 70 | (Category$_c$) |
| Theme$_4$ | 27 | (Category$_d$) |
| . | . | . |
| . | . | . |
| . | . | . |
| Theme$_n$ | 8 | (Category$_z$) |

As shown in Table 1, a document theme vector 160 for a document includes a list of document themes, indicated in Table 1 by Theme$_1$–Theme$_n$. Each theme has a corresponding theme strength. The theme strength is calculated in the content processing system 110. The theme strength is a relative measure of the importance of the theme to the overall content of the document. For this embodiment, the larger the theme strength, the more important the theme is to the overall content of the document. The document theme vector 160 lists the document themes from the most important to the least important themes (e.g., theme$_1$–theme$_n$).

The document theme vector 160 for each document further includes, for some themes, a category for which the theme is classified. The classification category is listed in the third column of the document theme vector shown in Table 1. For example, theme$_1$ is classified in category$_a$, and theme$_3$ is classified in category$_c$. Note that for this example, theme$_2$ is not classified in a category after the content processing stage, (i.e., a specific category or context for theme$_2$ was not identified). As explained more fully below, the learning processing 165 attempts to learn the context of themes and terminology not previously classified.

Figure 2:
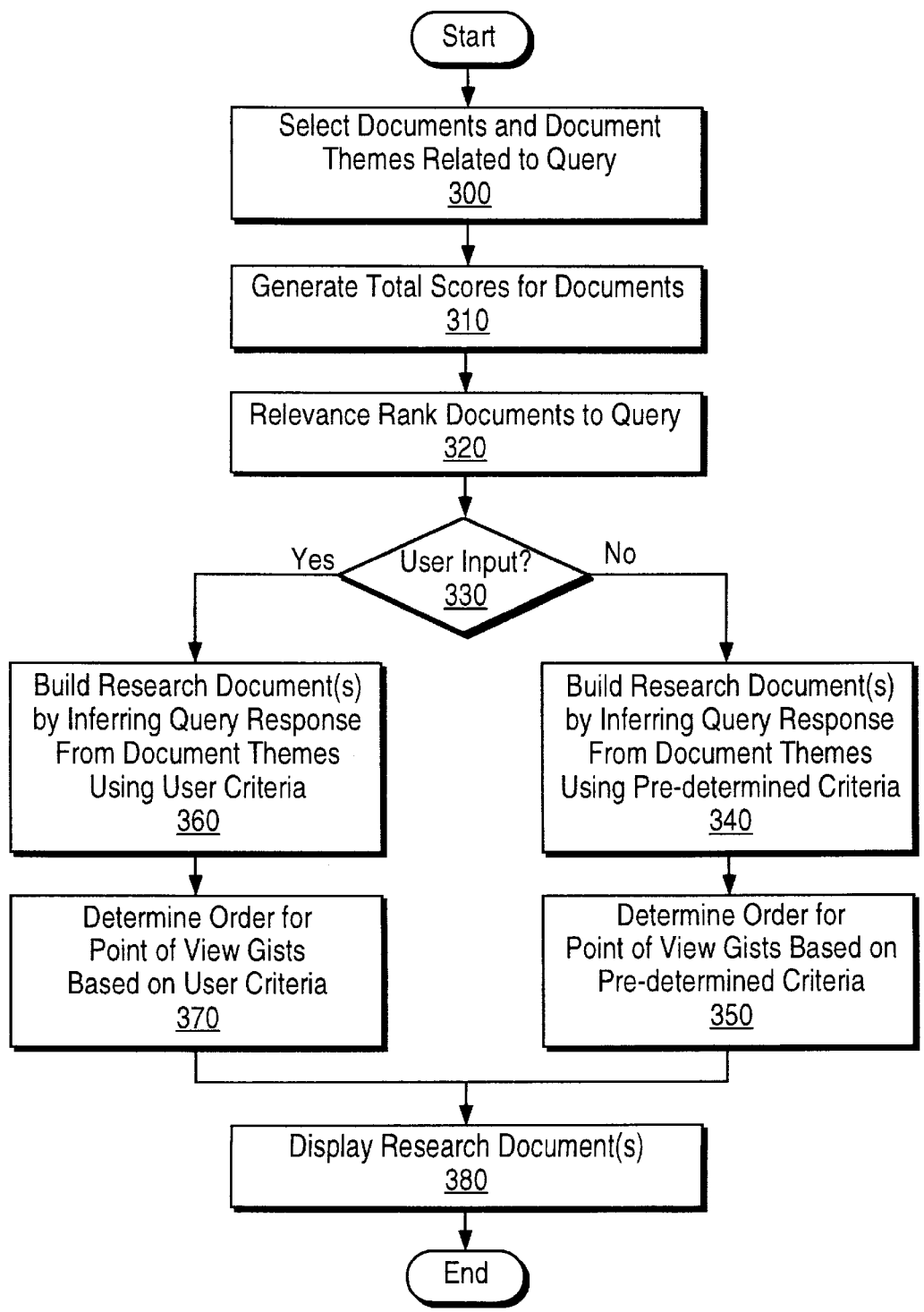
FIG. 2 is a flow diagram illustrating one embodiment for research document processing.

Research Document Processing:

FIG. 2 is a flow diagram illustrating one embodiment for research document processing. As shown in block 300, documents and document themes, which relate to the input query, are selected. One embodiment for selecting documents and document themes is described below in the section "Selecting Documents and Document Themes." With the document set, the research document processing generates a total score, a quantitative value, that measures the relevance of documents and document themes to the input query. In one embodiment, the total score is a calculation based on: the number of query terms the document satisfied; the total query weights for the query terms the document satisfied; and the total theme weight for the relevant themes in the corresponding document. In one embodiment, these factors are weighed such that the number of query terms satisfied is the most important factor, the total query weights criteria is the second most important factor, and the total theme weights is the third and least important criteria.

As shown in block 320, the documents are relevance ranked with respect to the query. To relevance rank the documents, the total score is used such that the document with the highest total score is the most relevant document to the query. Relevance ranking documents with respect to the query provides a criteria for selecting documents to build one or more research documents.

In one embodiment, the research document processing may accept user input for use as criteria to build the research documents. Alternatively, research documents may be built based on predetermined criteria. If user input is not used, then the research document processing builds research documents by inferring a response to the query from document themes using pre-determined criteria as shown in blocks 330 and 340. In one embodiment, described more fully below, the research document processing selects documents, to satisfy each query term, beginning with the most relevant document. For the most relevant document, the additional themes or topics required to satisfy each part of the input query is determined. Specifically, the research document processing selects, to build a research document, a document that has both a common theme with the most relevant document as well as an additional theme or themes required to satisfy the remaining parts of the input query. In one embodiment, the criteria for selecting documents to build a research document includes: 1) selecting the document with the highest theme weight for the theme in common with the starting or most relevant document; and 2) selecting the document with the highest theme weight for the theme required to satisfy the additional query term.

As shown in blocks 330 and 360 of FIG. 2, if the user inputs criteria, the research document processing builds research documents by inferring a response to the query from document themes based on criteria input by the user. For example, the user may specify that one of the query terms is the most important term. With this information, the research document processing then selects documents to build the research document using the identified query term as the most important criteria.

To build research documents, regardless of the criteria used, the research document processing 210 selects point of view gists with slants toward the particular themes identified. Once a document is used to form a research document, the document, and corresponding point of view gist, is removed from consideration when building additional research documents. As shown in block 350, if user input is not used, the research document processing 210 determines an order to display the point of view gists for a research document. In one embodiment, the point of view gists are ordered for display in the research document in the same order as they were selected (e.g., the criteria discussed in conjunction with block 340). In a second embodiment, the point of view gists are sorted based on a score calculated by summing the corresponding theme weights and the query weights. In the second embodiment, the point of view gists are ordered based on the strongest (most relevant) content with respect to the input query. For this second embodiment, to calculate the score, both the common theme and the additional theme or themes required are used in the calculation. As shown in block 370 of FIG. 2, the research document processing may determine an order for the point of view gists based on user criteria input.

As shown in block 380, one or more research documents are displayed. In one embodiment, the search and retrieval system displays the most relevant or "best" research document generated based on the criteria used. The search and retrieval system further displays information to permit the user to select one or more additional research documents for display. In one embodiment, the search and retrieval system provides a user the ability to scan through the research documents for viewing. To implement this feature, the search and retrieval system displays research documents from the most relevant to the least relevant based on the criteria used to build the research documents.

The research document processing includes a feature to generate a new set of research documents based on criteria different from previous calculations. For example, the research document processing may generate new research documents using a different equation, and/or a different focus for building the research documents. The user may further select which combinations are most important, and the new selected combinations are used to generate a new set of research documents. Accordingly, with the research paradigm of the present invention, different research documents, which focus on different subject matter, are generated, and a user may scan through the research documents to select combinations that make sense to the user.

In one embodiment, the user may input time criteria to select the newest documents available. For this embodiment, the research document processing 210 uses the time stamp of a document (i.e., the date of the information in the document), as a criteria to select documents to build research documents. For example, a user may specify that only documents after "1995" be used to generate research documents.

Although research document processing has been described in conjunction with specific embodiments that define criteria to select content for the research documents, any equation and/or focus, as well as any combination thereof, may be used to generate research documents without deviating from the spirit and scope of the invention.

A Research Mode Example:

The following example illustrates the research mode in accordance with the embodiment disclosed in the flow diagram of FIG. 2. The example input query is:

CIA involvement in South American Revolutions.

With this query, a user seeks to find information about the involvement of the CIA in revolutions that occur in South America. There are four distinct parts for this example input query: CIA, revolutions, involvement, and South America. As discussed fully below, the query term processing 205 (FIG. 4) analyzes the input query "CIA involvement in South American revolutions", and extracts the content carrying words from the input query phase. For this example, the query term processing 205 eliminates the word "in." Also, the query term processing 205 determines that the word "involvement" conveys little content. For this example, the word "involvement" is eliminated for analysis of the query due to the low content carrying value of the word.

All applicable senses and forms are generated for the terms "CIA", "revolutions", and "South American." For example, the term "South America" is generated for the term "South American", and the term "revolution" is generated for the term "revolutions." For purposes of simplicity, this example focuses on analysis of the terms "CIA", "revolution", and "South America."

The search and retrieval system selects documents and document themes related to the query (e.g., documents and document themes related to "CIA", "revolution", and/or "South America"). (FIG. 2, block 300). One embodiment for selecting documents and document themes related to a search query is described more fully below in the section "Selecting Document and Theme Sets."

The research document processing generates total scores for documents. (FIG. 2, block 310). In one embodiment, the search and retrieval system generates strengths for the query terms through use of a lexicon. In general, the lexicon assigns quantitative values to words based on the content carrying strength or value of the corresponding word. Table 2 lists query term strengths for the corresponding query terms "CIA", "revolution", and "South America."

TABLE 2

| Query Term | Query Term Strength |
| --- | --- |
| CIA | 100 |
| Revolution | 50 |
| South America | 70 |

Specifically, the query term "CIA" has a query term strength of 100, "revolution" has a query strength of 50, and "South America" has a query term strength of 70.

For this example, eight documents, relevant to the query terms, were identified. The eight documents are $document_{100}$, $document_{200}$, $document_{300}$, $document_{400}$, $document_{500}$, $document_{600}$, $document_{700}$, and $document_{800}$. Table 3 lists, in the first column, the example document set.

TABLE 3

| Document | Theme(s) | Theme Weight(s) |
| --- | --- | --- |
| $Document_{100}$ | Bob Smith | 70 |
|  | Bill Jones | 80 |
| $Document_{200}$ | Revolutions | 50 |
|  | X Agency | 65 |
| $Document_{300}$ | CIA | 90 |
|  | Bob Smith | 75 |
| $Document_{400}$ | CIA | 65 |
|  | South America | 70 |
|  | Bob Smith | 40 |
|  | X Agency | 25 |
| $Document_{500}$ | Bill Jones | 10 |
|  | CIA | 60 |
| $Document_{600}$ | South America | 25 |
|  | Revolutions | 35 |
|  | Bill Jones | 40 |
| $Document_{700}$ | South America | 10 |
|  | Bill Jones | 70 |
|  | Peru | 55 |
| $Document_{800}$ | Bill Jones | 40 |
|  | Revolutions | 35 |

The second column of Table 3, labeled "Theme(s)", lists themes for the corresponding document identified in column 1. For this example, $document_{100}$ includes themes, or thematic information, about "Bob Smith" and "Bill Jones." For purposes of this example, the list of themes for each document have been reduced. For example, in one embodiment, sixteen themes are identified for each document.

The third column in Table 3 identifies a theme strength or theme weight for the corresponding theme. For example, the theme "Bob Smith" has a theme weight of 70. In general, the theme weight is a quantitative value that measures thematic importance of the theme relative to other themes in a document.

In one embodiment, a total score is generated for each document. Table 4 shows the generation of a total score for each document in the example document set.

TABLE 4

| Documents | # of Query Terms (X Factor) | Total Query Weights (X Factor) | Total Theme Weights | Total Score |
|---|---|---|---|---|
| $Document_{100}$ | 0 | 0 | 150 | 150 |
| $Document_{200}$ | $1 \times 10^6$ | 50,000 | 115 | 1,050,115 |
| $Document_{300}$ | $1 \times 10^6$ | 100,000 | 165 | 1,100,165 |
| $Document_{400}$ | $2 \times 10^6$ | 170,000 | 200 | 2,170,200 |
| $Document_{500}$ | $1 \times 10^6$ | 100,000 | 70 | 1,100,070 |
| $Document_{600}$ | $2 \times 10^6$ | 120,000 | 100 | 2,120,100 |
| $Document_{700}$ | $1 \times 10^6$ | 70,000 | 135 | 1,070,135 |
| $Document_{800}$ | $1 \times 10^6$ | 50,000 | 75 | 1,050,075 |

The first column labeled "documents", identifies each document in the example document set. The second column, labeled "# of query terms", is generated by multiplying the number of query terms that a document satisfied times a factor (e.g., $1 \times 10^6$). For example, $document_{400}$ included themes for "CIA" and "South America." Thus, $document_{400}$ satisfied two of the three query terms, and therefore received a score of $2 \times 10^6$.

The third column of Table 4 is generated by multiplying the total query weight by the factor of 1000. For example, $document_{200}$, which satisfied the query term "revolution", received a score of 50,000 (i.e., 50 for the query weight of "revolution" $\times 1000$). The third column of Table 4 lists the total theme weight for the corresponding document. For example, $document_{700}$ which includes themes for "South America", "Bill Jones", and "Peru", has a total theme weight of 135 (i.e., 10+70+55). The fourth column, labeled "total score", is calculated by summing the values from columns 2, 3, and 4. In general, the total score provides a quantitative value to measure the relevance of the corresponding document to the query terms.

The research document processing builds research documents by inferring a response to the query from more than one document (FIG. 2, block 340). In one embodiment, the documents from the document set are relevance ranked, with regard to the query, using the total score (e.g., fourth column of Table 4). FIG. 3 illustrates a working matrix for the example query. As shown in the first column of FIG. 3, the documents for the document set are relevance ranked, from the most relevant document, $document_{400}$, to the least relevant document, $document_{100}$. As shown in FIG. 3, the example matrix includes a number of additional columns, one for each query term and one for each theme identified in Table 3. An "X" in the matrix of FIG. 3 indicates that the content of the document includes thematic information for the identified theme or query term. For example, the row for $document_{400}$ has an "X" for the query terms "CIA", "South America", and as well as an "X" for the themes "Bob Smith", and "X Agency." Thus, $document_{400}$ includes themes for CIA, South America, Bob Smith, and X Agency. Similarly, the matrix indicates whether the themes listed appear in a document of the example document set.

For purposes of explanation, the matrix shown in FIG. 3 illustrates how themes are used to infer a response to a query from multiple documents. In one embodiment, to generate research documents, the research document processing selects, starting from the most relevant document, additional documents that have a common theme as well as themes required to satisfy the remaining portions of the query. For this example, $document_{400}$ satisfies two query terms: "CIA" and "South America." Thus, an additional document, which includes information about the topic "revolution", is required to satisfy all parts of the query. $Document_{400}$ includes the themes "Bob Smith" and "X Agency." $Document_{300}$ and $Document_{100}$ both contain the theme "Bob Smith", as a common theme. The theme "X Agency" is a common theme between $document_{400}$ and $document_{200}$. However, $Document_{200}$ also includes the needed or required theme, "revolution." To generate a research document, the research document processing selects $document_{200}$, because it includes both the common theme, "X Agency", and the needed or required theme, "revolution." Once a document is used to form a research document, the document is removed from consideration when building additional research documents.

Table 5 lists point of view gists for an example research document for the above example query. As shown in Table 5, a research $document_{900}$ is created from $document_{400}$ and $document_{200}$. Specifically, point of view gists, with a slant toward the corresponding themes, are selected to compile the research $document_{900}$. The second column of Table 5 lists each theme for which a point of view gist is selected. The research $document_{900}$ is made up of point of view gists with a slant toward the query terms "CIA", "South America", and "revolution." In addition, the research $document_{900}$ includes point of view gists with a slant toward the theme "X Agency", for both $document_{400}$ and $document_{200}$, to show the common theme.

TABLE 5

Research $Document_{900}$

| Documents | Point of View Gists |
|---|---|
| $Document_{400}$ | CIA |
|  | South America |
|  | X Agency |
| $Document_{200}$ | X Agency |
|  | Revolutions |

As discussed above, an order to display the point of view gists for a research document is determined. In one embodiment, the point of view gists are ordered for display in the research document in the same order as they were selected. For the research $document_{900}$ example, using the criteria of the first embodiment, point of view gists are displayed in the following order: CIA, South America, X Agency (from $document_{400}$), X Agency (from $document_{200}$) and revolution. In a second embodiment, the point of view gists are sorted based on a total score calculated by summing the corresponding theme weights and the query weights. The point of view gists are then ordered based on the highest total score. For the research $document_{900}$ example, using the criteria of the second embodiment, scores are calculated as set forth in Table 6 below.

TABLE 6

Research $Document_{900}$

| Document | Theme | Total Score |
|---|---|---|
| 400 | CIA | 165 |
| 400 | South America | 140 |
| 400 | X Agency | 25 |
| 200 | X Agency | 65 |
| 200 | Revolutions | 100 |

The theme "CIA" received a total score of 165 by summing the query term strength for the query term satisfied (query term strength for "CIA" is 100) and the theme weight for the theme in that document (theme weight for "CIA" in $document_{400}$ is 65). For the research $document_{900}$ example, point of view gists are displayed in the following order: CIA, South America, revolution, X Agency (from document$_{200}$), and X Agency (from document$_{400}$).

In one embodiment, additional research documents are generated, through a similar process, for the remaining documents (i.e., documents not previously selected). In one embodiment, the more common themes a document has in common with a base document (e.g., base document is document$_{400}$ for research document$_{900}$) the more highly ranked the document is in the selection process.

Table 7 illustrates the contents of an example research document$_{1000}$.

TABLE 7

Research Document$_{1000}$

| Documents | Point of View Gists |
|---|---|
| Document$_{600}$ | South America |
| | Revolution |
| | Bill Jones |
| Document$_{500}$ | Bill Jones |
| | CIA |

To generate research document$_{1000}$, the second most relevant document, document$_{600}$, is selected. Document$_{600}$ includes information about the topics "South America" and "revolution", but it does not include information about the topic "CIA." Thus, to satisfy all query terms, the research document processing selects document$_{500}$ for the common theme "Bill Jones" and the needed theme "CIA." A similar process is used to generate research document$_{1100}$.

Table 8 illustrates the contents of an example research document$_{1100}$.

TABLE 8

Research Document$_{1100}$

| Documents | Point of View Gists |
|---|---|
| Document$_{300}$ | CIA |
| | Bob Smith |
| Document$_{100}$ | Bob Smith |
| | Bill Jones |
| Document$_{700}$ | Bill Jones |
| | Peru |
| | South America |
| Document$_{800}$ | Bill Jones |
| | Revolution |

To generate research document$_{1100}$, the research document processing selects the next most relevant document, document$_{300}$. Document$_{300}$, which includes the theme for the query term "CIA", does not include any other query term. Furthermore, no other document in the document set has a common theme to directly correlate the theme "CIA" to the other query terms "South America" and "revolution." However, the "South America" and "revolution" query terms are inferred through the themes "Bob Smith" and "Bill Jones", contained in document$_{100}$. Thus, to generate research document$_{1100}$, the research document processing infers the associations of "CIA" to "South America" via the themes: Bob Smith, Bill Jones, and Peru. The research document processing infers the associations of the query term "CIA" to the query term "revolution" through the themes "Bob Smith" and "Bill Jones."

Query Term Processing:

FIG. 4 is a block diagram illustrating one embodiment for query processing. As shown in FIG. 4, the query processing block 175 receives user query and user input criteria. A query term processing block 205 divides the query into distinct parts. Different senses are then generated for each part of the query. Typically, words in a query consist of nouns, adjectives, adverbs, and verbs. If the input query consists of an adjective, adverb or verb, then the query term processing 205 converts the query term to a nominal form. For example, the verb "to fish" is converted to "fishing", and the verb "performing" is converted to "performance." If the input query term consists of a noun, then the term is in the proper form for reference to the knowledge base 155.

The query term processing 205 further analyzes query terms to determine whether a noun query term has a mass sense and/or a count sense. For example, the word "baseball", which is the mass sense of the word, has a completely different meaning than the count sense, "baseballs." If the word has both a mass sense and a count sense, then the query term processing 205 references both the mass sense and count sense to the knowledge base 155 (i.e., both the mass sense and the count sense are used in query processing).

The noun form of a word may have a different meaning than the nominal form of the word. For example, the noun form of "fish" has a different meaning than the nominal form "to fish", which refers to the act of fishing. When applicable, the query term processing 205 references both the noun and the nominal form to the knowledge base 155. Because the noun sense of a word may be different than the nominal sense, and the mass sense may be different than the count sense, a separate classification exists for nominal and noun forms as well as for mass and count senses in the knowledge base 155. Accordingly, the query term processing 205 generates, when applicable, the noun form, the nominal form, the mass sense, and the count sense for each part of the input query.

In one embodiment, the query term processing 205 further includes processes for case sensitivity. In general, the process of matching query terms to knowledge base 155 entries is a case sensitive process. For example, if the query term is "Oracle", then, for a match, a knowledge base 155 category/term must include "Oracle." Thus, the entry "oracle" would not match the query term "Oracle." This example illustrates a case sensitive matching system.

The query term processing 205 includes processes to eliminate the case sensitivity problem, when appropriate. The content processing system 110 (FIG. 10) includes a lexicon 760. The lexicon 760 contains information (e.g., definitional characteristics) for a plurality of words. One definitional characteristic defines the part of speech for the corresponding word. For example, the lexicon 760 identifies whether a word is a common noun. Furthermore, the lexicon 760 identifies the amount of content carrying information for a corresponding word. In general, the query term processing 205 utilizes the definitional characteristics in the lexicon to determine whether to generate a lower case term from an upper case term when input as a query term. In one embodiment, the query term processing 205 generates lower case terms if the corresponding upper case term is both a common noun and a content carrying word. Names, which are proper nouns, are not converted. For query terms converted, both the upper case term and the lower case term are used to process the query. Although certain upper case terms are converted to lower case terms, the original upper case query term is considered more relevant to the original query than the lower case term.

As described fully below, research document processing 210 references the knowledge base 155, document theme vectors 160, and point of view gists 230 to generate a response to the user query. The query processing block 175 outputs response information to a screen module 230. In general, the screen module 230 processes the response information to display the retrieval information in a predetermined form. Embodiments for displaying retrieval information are shown in FIGS. 8a, 8b, 9a, 9b, and 9c. A screen module, such as screen module 230, which processes information for display on a computer output display, is well known in the art and will not be described further.

Figure 5:
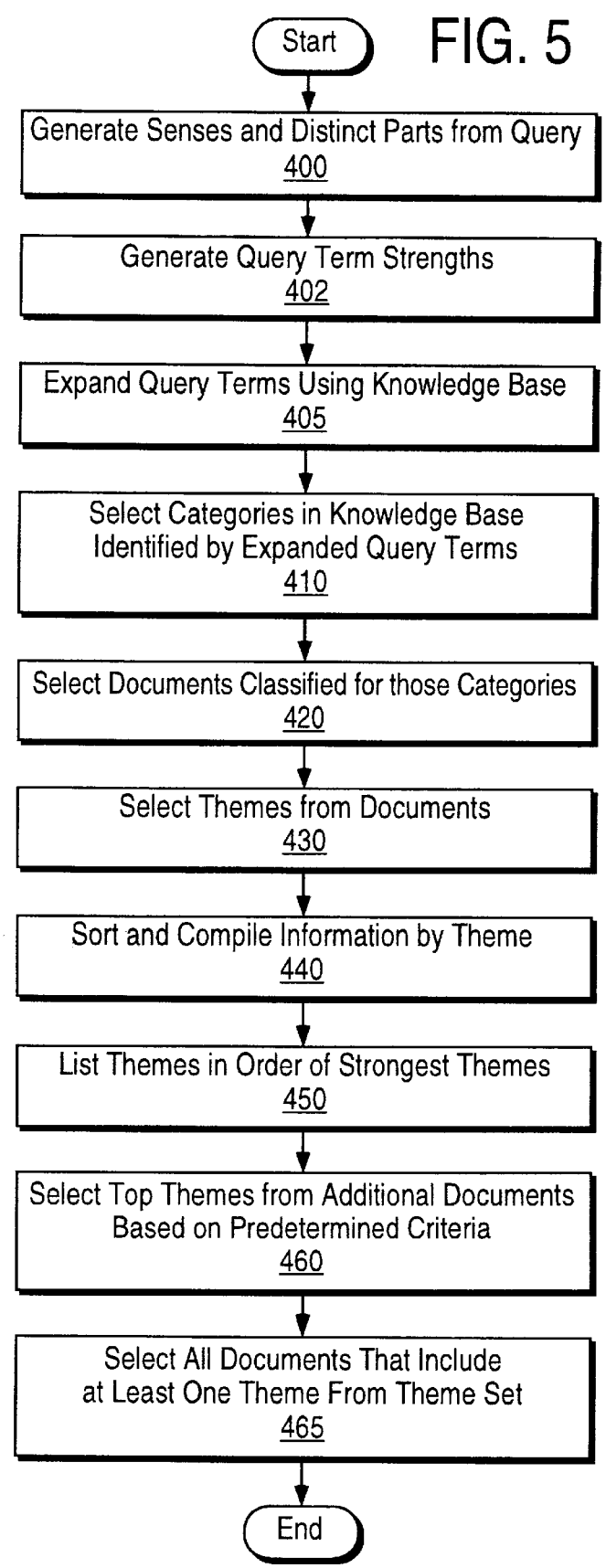
FIG. 5 is a flow diagram illustrating one embodiment to select documents for research document processing.

Document and Document Theme Set:

FIG. 5 is a flow diagram illustrating one embodiment for selecting documents for research document processing. The input query is divided into distinct parts, and for each part, the query term processing 205 generates the different possible senses and forms as discussed above. This operation is shown in block 400 of FIG. 5. As shown in block 402, query term strengths are generated. Using the knowledge base 155, query terms are expanded as shown in block 405. The use of the knowledge base 155 in query processing is described more fully below in the section "Knowledge Base." Categories from the knowledge base 155 are selected based on the expanded query terms as shown in block 410.

For each category/term in the expanded query term set, the process selects documents classified for those categories as shown in block 420 of FIG. 5. Tables 9–11 contain data for an example of selecting documents for research document processing. Table 9 includes two columns.

TABLE 9

| Documents | Themes |
| --- | --- |
| 1 | $T_{1(01)}$ - $T_{1(16)}$ |
| 2 | $T_{2(01)}$ - $T_{2(16)}$ |
| 3 | $T_{3(01)}$ - $T_{3(16)}$ |
| 4 | $T_{4(01)}$ - $T_{4(16)}$ |

The first column, labeled documents, lists the documents classified for categories in the expanded query term set. The second column, labeled themes, includes a list of themes contained in a corresponding document. For this example, four documents were classified for the categories in the expanded query term set. The themes are selected from the documents as shown in block 430 of FIG. 5. For the embodiment shown in FIG. 1, the research document processing extracts the themes for each document from the document theme vector 160. In one embodiment, the content processing system 110 identifies 16 of the most important themes, and therefore each document listed in Table 9 includes 16 themes.

As shown in block 440, the themes are sorted and compiled. Table 10 shows a portion of the themes of Table 9 sorted for an example search about France. Table 10 consists of a column for themes, and a column for documents that include the corresponding themes. For this example, information on "wine" is found in documents 1, 2, and 4. Information on "cheeses" was identified in documents 1 and 3, and information on "impressionism" was identified in documents 1, 3, and 4. Also, information on "chateaus" was identified in document 2. The "wine" theme has a theme strength of 170 in document 1, a theme strength of 60 in document 2, and a theme strength of 90 in document 4.

TABLE 10

| Themes | Documents (4) | Theme Strengths |
| --- | --- | --- |
| Wine | 1, 2, 4 | 170, 60, 90 |
| Cheeses | 1, 3 | 110, 60 |
| Impressionism | 1, 3, 4 | 125, 170, 4 |
| Chateaus | 2 | 20 |

After the sorting of themes, the themes are listed in the order of the strongest themes as shown in block 450 of FIG. 5. Table 11 shows the listing of the themes of Table 10 based on the strongest themes.

TABLE 11

| Themes | Documents | Theme Strengths |
| --- | --- | --- |
| Wine | 1, 2, 4 | 170, 60, 90 |
| Impressionism | 1, 3, 4 | 125, 170, 4 |
| Cheeses | 1, 3 | 110, 60 |
| Chateaus | 2 | 20 |

In one embodiment, to order the themes, the theme identified in the most documents is considered the strongest theme. If themes have the same number of documents, then the total theme strength, calculated for each document in which the theme appears, is used to identify the strongest theme (e.g., the strongest theme is the theme with the highest total theme strength from all the documents). As shown in Table 10, "wine" and "impressionism" were both identified in three documents. "Wine", having a total theme strength of 320 (e.g., 170+60+90), has a greater total theme strength than "impressionism", having a total theme strength of 299. "Cheeses", being identified in two documents, is listed as the third strongest theme, and "chateaus", which was identified in only a single document, is identified as the fourth strongest theme.

As shown in block 460 of FIG. 5, the process selects the top themes based on a predetermined criteria. For one embodiment, the process selects themes based on a predetermined number of themes or based on a minimum total theme strength. For this example, the research document processing selects only themes identified for more than one document. Thus, "chateaus" is eliminated.

Based on the themes selected, the research document processing selects all documents that include at least one theme from the theme set as shown in block 465 of FIG. 5. For the example shown in Table 10, documents that include themes for "wine", "impressionism" and "cheese" are selected. The documents are identified by the document theme vector 160.

Figure 6:
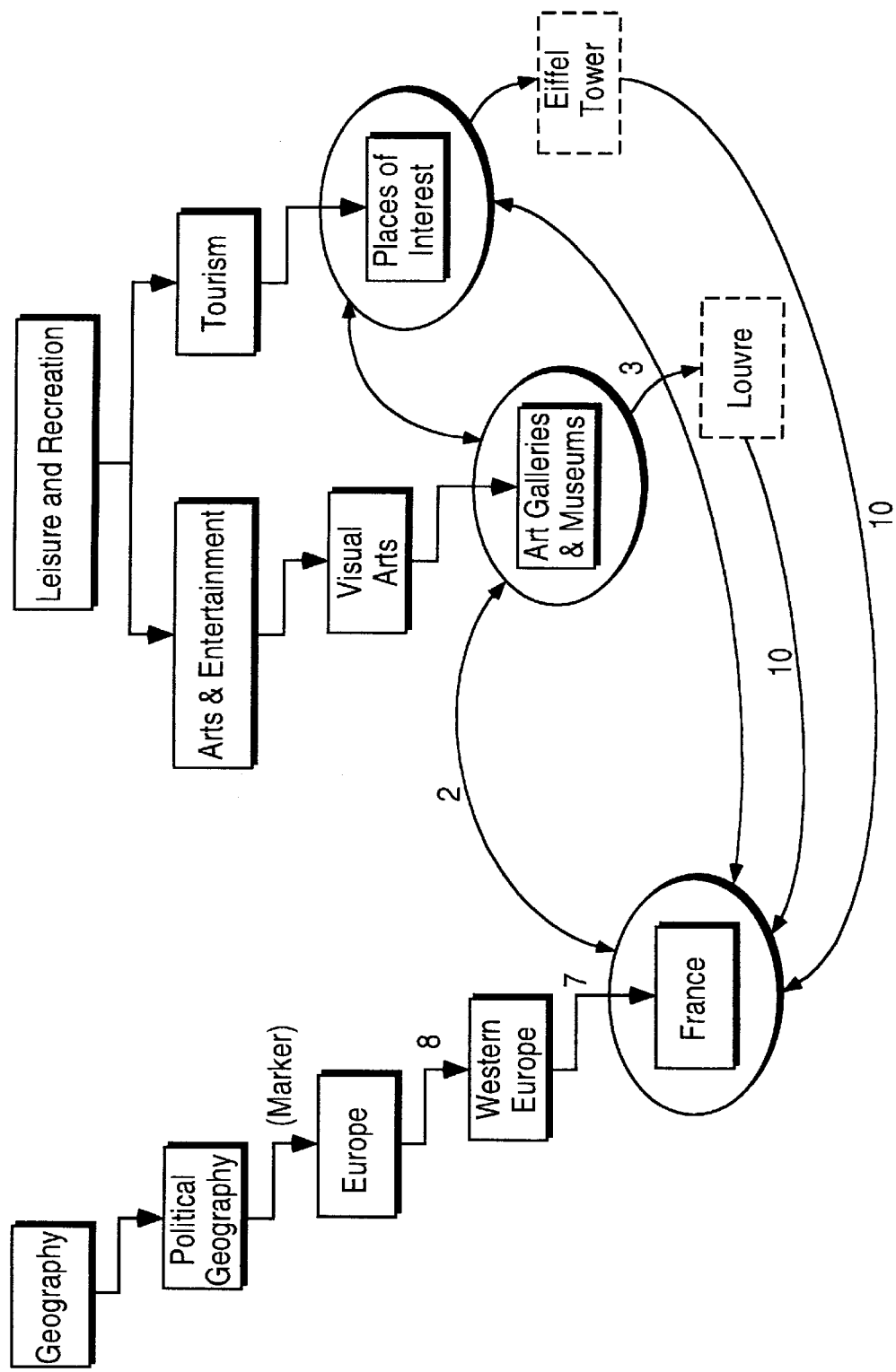
FIG. 6 illustrates an example portion of a knowledge base augmented to include additional terminology.

Knowledge Base:

The knowledge base 155 contains classification categories or topics, such as the knowledge catalog 150, augmented with additional terminology including cross references and links among terminology/categories. FIG. 6 illustrates an example portion of a knowledge base augmented to include additional terminology as well as cross references and links among categories and terms. The classification hierarchy and notations shown in FIG. 6 illustrate an example that classifies a document on travel or tourism, and more specifically on traveling to France and visiting museums and places of interest. As shown in FIG. 6, the classification categories (e.g., knowledge catalog 150) contains two independent static ontologies, one ontology for "geography", and a second ontology for "leisure and recreation." The "geography" ontology includes categories for "political geography", "Europe", "Western Europe", and "France." The categories "arts and entertainment" and "tourism" are arranged under the high level category "leisure and recreation." The "visual arts" and the "art galleries and museums" are subcategories under the "arts and entertainment" category, and the category "places of interest" is a subcategory under the category "tourism."

The knowledge base 155 is augmented to include linking and cross referencing among categories for which a linguistic, semantic, or usage association has been identified. For the example illustrated in FIG. 6, the categories "France", "art galleries and museums", and "places of interest" are cross referenced and/or linked as indicated by the circles, which encompass the category names, as well as the lines and arrows. This linking and/or cross referencing indicates that the categories "art galleries and museums" and "places of interest" may appear in the context of "France."

The knowledge base 155 includes terminology classified or associated with categories. For the example shown in FIG. 6, the terminology includes "Louvre" and "Eiffel Tower." For this example, the knowledge base 155 indicates that the Louvre, a proper noun, is classified under the category "art galleries and museums", and further associates the term "Louvre" to the category "France." Similarly, the knowledge base 155 indicates that the term "Eiffel Tower" is classified under the category "places of interest", and is also associated with the category "France."

The knowledge base 155 may be characterized, in part, as a directed graph. The directed graph provides information about the linguistic, semantic, or usage relationships among categories and terminology. The "links" and "cross references" on the directed graph, which indicate the associations, is graphically depicted in FIG. 6 using lines and arrows. For the example shown in FIG. 6, the directed graph indicates that there is a linguistic, semantic, or usage association among the concepts "France", "art galleries and museums", and "places of interest."

In one embodiment, the knowledge base 155 includes two types of associations: cross references and links. The cross reference associations are predetermined (e.g., prior to document processing) by a linguist. In general, the linguist develops cross reference associations when two terms/categories have a strong linguistic, semantic, or usage relationship. For example, a linguist may generate a cross reference association to denote the strong association between the term "Eiffel Tower" and the category "France." The second type of association in the knowledge base, links, is generated through processing documents. For example, if documents processed to develop the knowledge base 155 included thematic information relating "art galleries and museums" to "France", then a link, associating the categories "France" and "art galleries and museums", may be developed. When utilizing the knowledge base 155 to process queries, the distinction between a link association and cross reference association is made as described more fully below.

The links and cross references on the knowledge base 155 directed graph further include distance weights. In general, the distance weights provide a quantitative value to indicate the strength of the linguistic, semantic, or usage relationship between two categories/terms. FIG. 6 also shows distance weights directly above the links and cross references for a corresponding association. In one embodiment, associations have distance weights ranging from 1–10. For this embodiment, the knowledge base 155 generates one distance point or weight for each one hundred linguistic, semantic, or usage associations identified during processing in the content processing system 110. For example, the link association between the categories "France" and "art galleries and museums" was developed by the processing of at least two hundred documents that associated "art galleries and museums" with "France" (e.g., "art galleries and museums" were discussed in the context of "France."). Two strong associations (e.g., 10 distance points or weights), define the associations between both "Eiffel Tower" and "Louvre" with "France." The ten distance weights indicate that at least one thousand documents associated the terms "Eiffel Tower" and "Louvre" with "France." Thus, the distance weights indicate the strength of a corresponding linguistic, semantic, or usage relationship between two categories/terms. The distance weights are also shown among the categories, including the distance between a child category, such as "visual arts", and its parent category, "arts and entertainment."

In one embodiment, the knowledge base 155 further includes association markers. In general, the association markers indicate that the linguistic, semantic or usage association between the child category and the parent category is too weak to generalize. For the example portion of a knowledge base shown in FIG. 6, distance weights are shown to generalize from the child category, "France", to its parent category "Western Europe." Similarly, there is a high or long distance weight to go from the child category "Western Europe" and its parent category "Europe." However, between the child category "Europe" and its parent category "Political Geography", the knowledge base 155 includes a marker. The marker indicates that "Europe" should not be generalized to "Political Geography" when developing associations with the directed graph (e.g., knowledge base). A discussion of using the knowledge base 155 to analyze associations is described more fully below.

In one embodiment, the accumulated relationships, which define the distance weights, are generated using the document theme vectors 160. As discussed above, a document theme vector 160 indicates themes identified for a corresponding document. For this embodiment, an association link is defined if a document theme is classified in the corresponding category. For example, the document theme "Louvre" was contained in at least one thousand documents that were classified in the category "France" (e.g., the documents were primarily about France but included thematic information about the Louvre).

Expanding Query Terms With The Knowledge Base:

In one embodiment, query terms or query phrases are processed to identify the thematic content of terms of the input queries. In general, query term processing involves analyzing the query phrase or terms to determine the most important thematic information in the query terms. In one embodiment, the query processing assigns or generates a query strength to each term, wherein the query strength indicates the relative thematic importance among terms or words in the query. For example, a user may input to the search and retrieval system 100 the phrase "pollution caused by European space stations." For this example, the query processing analyzes the input query to determine that the terms "pollution" and "space stations" are the most important, followed by the term "Europe." The term "cause" receives a much lower query term strength, and the word "by" is completely eliminated for purposes of analysis.

Query term strengths are generated for the distinct parts and senses of the query (See block 402, FIG. 5). In one embodiment, to generate the query term strengths, the query processing utilizes a lexicon that includes a corresponding strength for each word. The query strengths indicate the amount of thematic information that the word conveys relative to other words. For example, the noun "class" by itself conveys little thematic information. To the contrary, a global identifier, such as the term "biology", conveys large amounts of thematic information because the word directs or orients a reader to a specific topic. The use of query term strengths is discussed more fully below.

Figure 7:
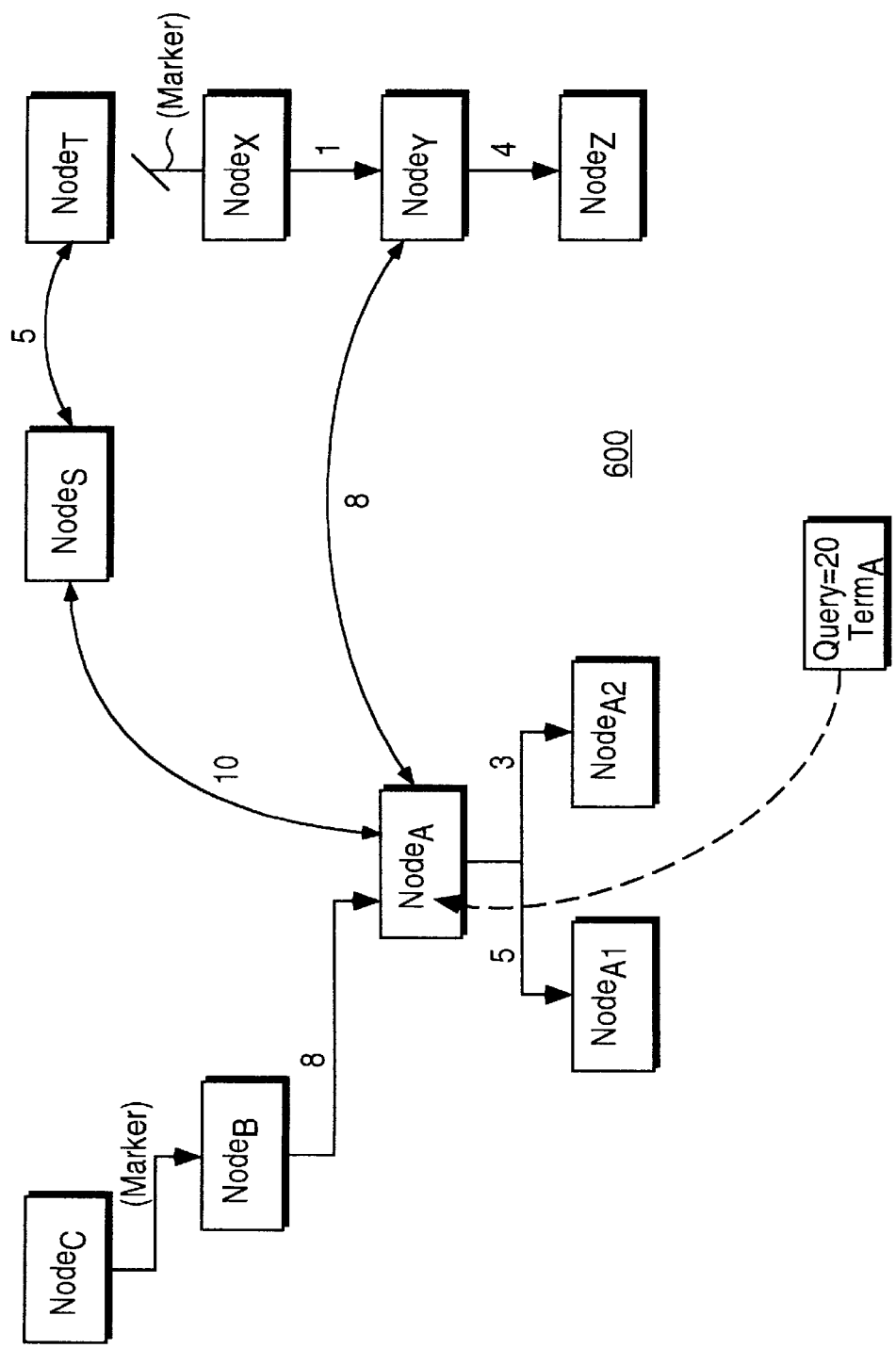
FIG. 7 illustrates one embodiment for expanding query terms using the knowledge base.

The knowledge base is used to expand the query terms to identify an expanded set of query terms(See block 405, FIG. 5). In general, the query terms are mapped to categories in the knowledge base. The directed graph of the knowledge base is then used to identify relevant categories/terms to expand the query term set to include related categories/terms. FIG. 7 is an example graph that illustrates one embodiment for expanding query terms using the knowledge base. Specifically, FIG. 7 shows a portion of a generalized directed graph that includes a plurality of categories/terms with related categories/terms.

As shown in FIG. 7, a query term$_A$, which has a query term strength of 20, is mapped directly into node$_A$ on directed graph 600. For example, query term$_A$ may be the term "pollution", and node$_A$ may be the category "pollution." For this example, node$_A$ is part of a classification hierarchy that includes, as parent categories, node$_B$ and node$_C$. Node$_{A1}$, and Node$_{A2}$ are child categories/terms classified under the node$_A$ category. As shown by the double headed arrows in FIG. 7, node$_A$ has an association with node$_S$ as well as an association with nodes. Node$_Y$ is part of a classification hierarchy that includes node$_X$, as the parent category, and node$_Z$ as a child category.

In general, to expand query terms using the knowledge base, the levels or tiers of the classification hierarchy as well as the knowledge base associations are used to select nodes within a predefined criteria. In one embodiment, the query term strength is decreased based on the distance weight, and all nodes with a resultant query term weight greater than one are selected. Specifically, query term weights are decreased by 50% for each point of semantic distance when expanding either to a more general category (e.g., to a parent category), or to an association. All child categories and terms beneath a node are selected. For the example shown in FIG. 7, node$_{A1}$ and node$_{A2}$ are selected. To expand up the classification hierarchy from node$_A$ to node$_B$, the query term$_A$ strength 20 is reduced 50% for each semantic distance point below 10. With a semantic distance weight of 8, the query term$_A$ strength of 20 is reduced to a query term strength of 5. In an attempt to expand even further up the classification hierarchy, nodec is considered. However, the link between parent nodes and child node$_B$ includes a marker; thus, nodes is not selected in the expanded query term set. The association between node$_A$ and nod$_Y$, which has a semantic distance weight of 8, results in the selection of node$_Y$ (e.g., query term$_A$ strength 20 is reduced to 5). Node$_Z$, a child node of node$_Y$, is selected because node$_Z$, is more specific (e.g., a lower level of the classification hierarchy). To determine whether to select node$_X$, the query term strength at node$_Y$, 5, is reduced by 50% per semantic point. With a semantic weight of 1, the query termA strength is reduced to a value below 1, and therefore node$_X$ is not selected.

Node$_s$, linked to node$_A$, is selected because the semantic distance weight of 10 does not reduce the query term$_A$ weight below 1. Finally, node$_T$ is not selected because the query term$_A$ strength of 20 is reduced below 1. Accordingly, for the example shown in FIG. 7, the expanded query term set for query term$_A$ is categories/terminology corresponding to node$_A$, node$_B$, node$_{A1}$, node$_{A2}$, node$_Z$, node$_Z$, and node$_S$.

In one embodiment, when expanding the query terms through associations other than directly through an ontology hierarchy, the query processing 175 distinguishes between cross reference associations and link associations. For cross reference associations (e.g., associations generated manually by a linguist), only one reference is required to select the category/term as an expanded query term. For the example directed graph illustrated in FIG. 7, if the association between node$_A$ and node$_Y$ is a cross reference association, then this single reference is sufficient to include node$_Y$ as an expanded query term. However, for link associations (e.g., associations generated through document processing), two references are required to select the category/term as an expanded query term. For the example directed graph illustrated in FIG. 7, if the association between node$_A$ and node$_Y$ is a link association, then an additional reference, such as a reference through a different query term, is required to include node$_Y$ as an expanded query term.

Figure 8A:
FIG. 8a illustrates an example display of the search and retrieval system to the query "Internet."

Search and Retrieval System Display Embodiments:

FIGS. 8a and 8b illustrate example display responses for the search and retrieval system to the search query "Internet." In response to the Internet query, the search and retrieval system located fifteen documents classified for the category "computer networking." Also, the search and retrieval system identified the terms "Internet Credit Bureau, Incorporated", "Internet Fax Server", "Internet Productions, Incorporated", and "Internet Newbies." As discussed above, the results are based on the query mapped to the knowledge base 155. Although no documents were classified under the terms "Internet Credit Bureau, Incorporated", "Internet Fax Server", "Internet Productions, Incorporated", and "Internet Newbies", the terms relate to the search query. The terms are displayed based on the relevance to the search term "Internet." For this embodiment, the relevancy system, indicated by the number of stars, indicates that the category "computer networking" is the most relevant to the query term "Internet."

FIG. 8b illustrates an example response when a user selects the category "computer networking." In response to this selection, the search and retrieval system displays a plurality of subcategories for which documents have been classified. Specifically, the search and retrieval system displayed the subcategories "Electronic Mail", "GE Networks", "Internet Technology", "Messaging", "NBC Networks", and "Networks." Thus, users are provided with more specific categories, relating to computer networking, to locate information about the general query term "Internet." The search and retrieval system also displays documents that contain information about computer networking, but are classified under different categories (e.g., Colorado, Mexican, NBC Officials, State Agencies, and Television and Radio). Furthermore, the search and retrieval system displays categories related to the computer networking category (e.g., see also Computer Hardware Industry, Computer Industry, Computer Standards, Information Technology, and Mathematics).

FIG. 9a illustrates an example display of the search and retrieval system to the query "stocks." In response to the query "stocks", the search and retrieval system maps the query into the knowledge base 155 to obtain all senses of related categories and terminology. For this example, sixty three categories were identified. The categories are relevance ranked, and the category "commerce and trade" is the most relevant.

FIG. 9b illustrates an example display in response to the selection to the category "portfolios." For this embodiment, the display indicates that four documents are classified in the category "portfolios." The search and retrieval system displays the name of the four documents, as well as the categories for which these documents have been classified.

FIG. 9c illustrates the display of a point of view gist for the query examples shown in FIGS. 9a and 9b. In response to selecting the documents "Money Managers With Smaller Stocks Hold Performance Lead, Study Shows" and "These Stocks Are a Nightmare—As S&P Climbs 21% Some Battered Stocks Still Dash Dreams", the search and retrieval system displays the point of view gist with the slant towards "stocks." Thus, a user may extract the relevant portion from the document without reading the entire document.

Figure 10:
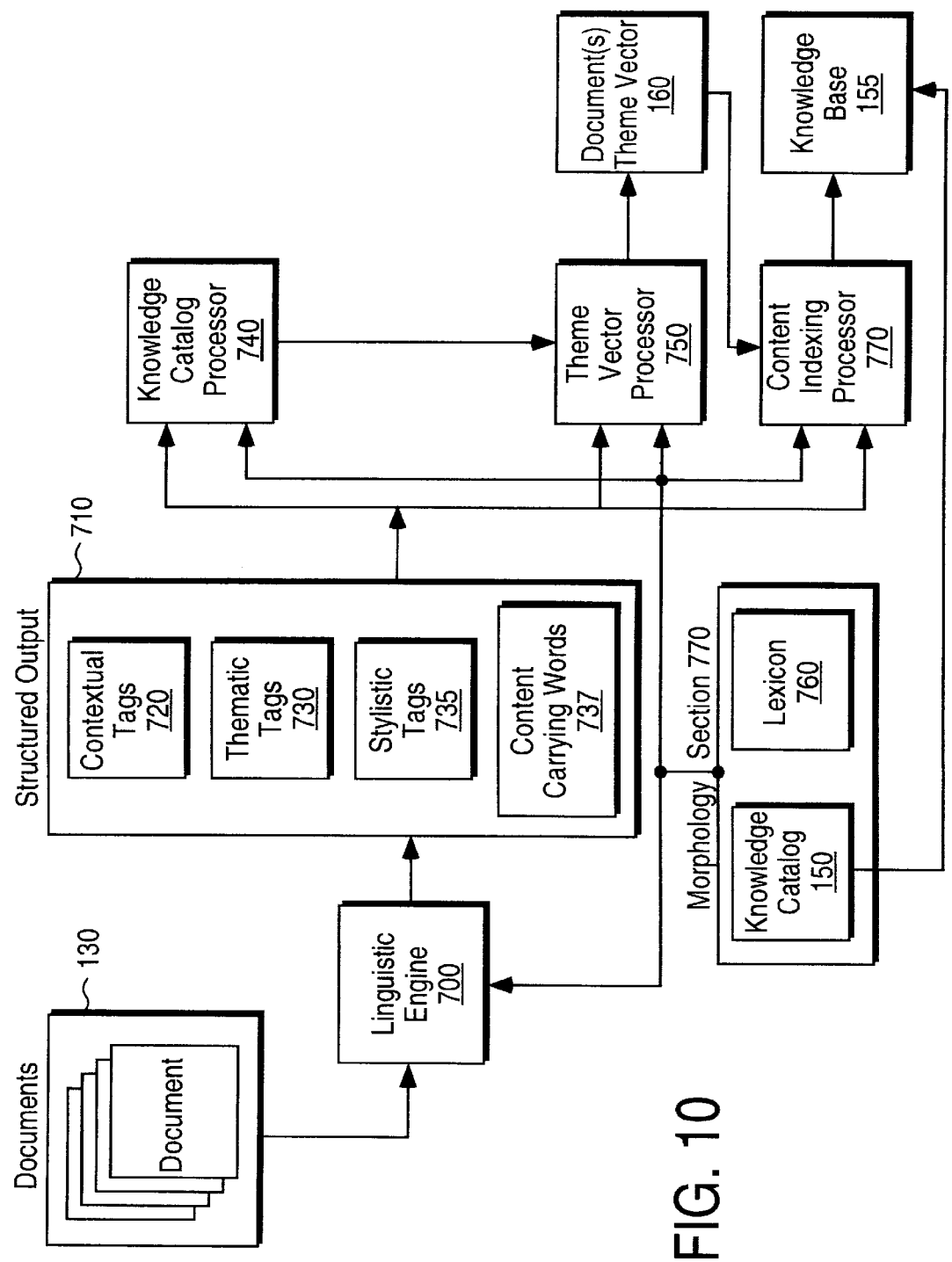
FIG. 10 is a block diagram illustrating one embodiment for a content processing system.

A Content Processing System:

FIG. 10 is a block diagram illustrating one embodiment for the content processing system 110. In general, the content processing system 110 analyzes the document set 130 and generates the document theme vector 160. For this embodiment, the content processing system 110 includes a linguistic engine 700, a knowledge catalog processor 740, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. patent application Ser. No. 08/454,745, inventor Kelly Wical, entitled "A Content Processing System for Discourse", filed May 31, 1995, that includes an Appendix D, entitled "Analysis Documentation."

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phases for each sentence in the documents, the context of the documents is defined. The chaos loop process stores information in the form of the contextual tags 720. U.S. patent application Ser. No. 08/454,745, inventor Kelly Wical, entitled "A Content Processing System for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see U.S. patent application Ser. No. 08/454,745, inventor Kelly Wical, entitled "A Content Processing System for Discourse", filed May 31, 1995.

As shown in FIG. 10, the morphology section 770 contains the knowledge catalog 150 and a lexicon 760. In general, the lexicon 760 stores definitional characteristics for a plurality of words and terms. For example, the lexicon 760 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B, entitled "Lexicon Documentation", of U.S. patent application Ser. No. 08/454,745, inventor Kelly Wical, entitled "A Content Processing System for Discourse", filed May 31, 1995.

The topics and content carrying words 737 are input to the knowledge catalog processor 740. In part, the knowledge catalog processor 740 processes the content carrying words for direct use with the knowledge catalog 150 and knowledge base 155. Specifically, the knowledge catalog processor 740 generates, as appropriate, the nominal or noun form of each content carrying word, as well as the count sense and mass sense of the word. Furthermore, the knowledge catalog processor 740 determines, from the knowledge catalog 150, which content carrying words are non ambiguous.

As shown in FIG. 10, the theme vector processor 750 receives the thematic tags 730 and contextual tags 720 from the structured output 710. In addition, the non ambiguous content carrying words from the knowledge catalog processor 740 are input to the theme vector processor 750. The content carrying words may include single words or phrases. The content carrying words output from the knowledge catalog processor 740 are converted to the noun or nominal form. In general, the theme vector processor 750 presents a thematic profile of the content of each document (e.g. generates the document theme vector 160 including classifying the documents in the knowledge catalog 150). To accomplish this, the theme vector processor 750 determines the relative importance of the non ambiguous content carrying words in the document set.

In one embodiment, the theme vector processor 750 generates a list of theme terms, including words and phrases, and assigns a relative theme strength to each theme term. The theme vector processor 750, through use of the knowledge catalog 150, generates a theme concept for each theme term by mapping the theme terms to categories in the knowledge catalog 150. Thus, the theme concepts indicate a general topic or category in the knowledge catalog 150 to identify the content of each document. In addition, the theme vector processor 750 generates, for each theme term, an importance number, a theme strength, and an overall capacity weight of collective content importance.

As discussed above, each theme identified in the document theme vector 160 is assigned a normalized or relative theme strength. The normalized theme strength is calculated using the theme strengths of each theme term in the text that contributes to the particular theme. At the sentence level, the theme vector processor 750 calculates a theme strength for each content carrying word in the sentence. The theme strength of the word measures the thematic weight of the word within the context of the sentence in which it appears. Prior to processing, each content carrying word receives a default theme strength that varies depending upon the word. As the theme vector processor 750 analyzes the surrounding text in the sentence to determine the thematic role of the word, it increases or decreases the theme strength for the word. For example, a theme grading determines how each word in a sentence is functioning within the context and structure of the sentence. The theme grading assigned to a word affects the theme strength for the word.

In one embodiment, the theme vector processor 750 executes a plurality of heuristic routines to generate the theme strengths for each theme. U.S. patent application Ser. No. 08/454,745, inventor Kelly Wical, entitled "A Content Processing System for Discourse", contains source code to generate the theme strengths in accordance with one embodiment for theme vector processing. The source code includes detailed comments to explain the operation of the code. Although the generation of the theme strengths is disclosed as computer source code, the theme strengths may be generated by any means, such as a hardware implementation, without deviating from the spirit or scope of the invention. Also, a further explanation of generating a thematic profile is contained in U.S. patent application Ser. No. 08/454,745, inventor Kelly Wical, entitled "A Content Processing System for Discourse", filed May 31, 1995, which is herein expressly incorporated by reference.

Dynamic Classification of Terminology:

The content indexing processor 770 shown in FIG. 10 identifies index phrases including index heads and index context entries that relate to the index heads. The index heads are content carrying words from the documents but the words are not pre-defined categories in the classification system. For example, the term "OS/2", which defines a specific operating system, is a content carrying noun. However, in one embodiment of a classification system, "OS/2" is not a specific category. If the documents 130 include material on "OS/2", then "OS/2" is stored as an index head. The index context entries are index phrases that are used within the context of an index head. For the OS/2 example above, if a document contained information on the marketing of the OS/2 operating system, then "marketing" is stored as an index context entry for the index head "OS/2." Note that marketing may also be stored as an index head. Index heads are dynamically classified in the classification hierarchy, and that classification is stored with the index head.

The knowledge base 155, which includes categories classified for the documents 130, identifies relationships among index heads, index context entries, and themes. To identify these relationships, the knowledge base 155 includes an index table and an index/topic table. The index table contains index information from the documents 130, including the text and location of the index phrases. If the index context entry is not an index head, then the index table contains the parent or index head for the index context entry. The index/topic table contains cross references between indexes, stored in the index table, and categories classified in document theme vector 116. For example, in one document, the index head "OS/2" may be mapped to the category "operating systems." For this example, the index/topic table reflects, for that document, the use of the term "OS/2" to connote an operating system. Therefore, the index/topic table provides a link between the index phrases and the categories in the classification hierarchy. A further explanation of generating a thematic profile is contained in U.S. patent application Ser. No. 08/454,745, inventor Kelly Wical, entitled "A Content Processing System for Discourse", filed May 31, 1995.

As discussed above, themes, which do not have a corresponding category in the classification hierarchy, are dynamically classified such that categories are generated to reflect terminology specific to a document. Once the new categories are generated, these categories are mapped into the pre-defined categories of the classification hierarchy.

In operation, the content indexing processor 770 receives themes from the document theme vector 160. In the preferred embodiment, categories in the classification hierarchy are based on noun concepts.

Based on the contextual tags 720 and thematic tags 730, the content carrying words from the documents 130 are identified. The head words represent all content carrying words in the documents 130. Generally, all nouns contained in the documents 130 are candidates for head words. The content indexing processor 770 utilizes contextual tags 720 and thematic tags 730 to determine nouns that contain little or no content value. For example, the noun "copies", without any additional support, carries little content alone. Therefore, if a noun is characterized as "weak" from the contextual tags 720 or thematic tags 730, then the noun is not utilized as a head word.

At this point, the content indexing processor 770 generates a plurality of head words, wherein each head word carries content. For each head word, at least one contextual relationship is noted. In one embodiment, the context for each head word is listed hierarchically such that a second contextual relationship to the head word is a more detailed relationship than the first contextual relationship for that head word. From these contextual relationships, the content indexing processor 770 develops categories not included in the classification hierarchy. Specifically, the new categories, arranged in a hierarchical structure, are dynamically generated based on head words and contextual relationships to the head words. After dynamically developing the new hierarchies, the content indexing processor 770 maps the dynamic hierarchies into pre-existing categories of the classification hierarchy. Thus, the content indexing processor 770 classifies terms of the documents 130 in the knowledge base 155 to extend the pre-existing categories of the classification hierarchy. For a further explanation of content indexing processing, see U.S. patent application, entitled "A Content Processing System for Discourse" Ser. No. 08/454,745, filed May 31, 1995, inventor Kelly Wical, and is herein expressly incorporated by reference. U.S. patent application, entitled "A Content Processing System for Discourse" Ser. No. 08/454,745, includes Appendix I, entitled "Content Indexing Code", that contains a source code listing for implementing content indexing processing in accordance with one embodiment of the present invention.

Learning Processing:

In one embodiment for the search and retrieval system, the learning processing 165 learns words and phrases (e.g., terminology) in the context of a set of documents. During an accumulation phase, the learning system accumulates contextual data from the set of documents for the term. In general, the contextual data specifies lexical classifications of documents in which the term appears based on the uses of other terms in the document set. In a subsequent computational phase, the learning system analyzes the contextual classification data to select, if the term is unambiguous, a single general classification for the term. The learning system, through accumulating contextual data from the set of documents prior to analyzing, uses a wholeness approach to learning.

In one embodiment, the learning processing 165 is used in conjunction with a classification system, such as the knowledge catalog 150. As discussed above, the categories in the knowledge catalog 150 reflect lexical relationships among parent and child categories. For this embodiment, the learning system, to accumulate contextual data, classifies the term in the categories, wherein the classifications are based on uses of the terms in the set of documents. The learning processing 165 analyzes the contextual data, and selects a single category, or multiple if ambiguous, in the classification system to classify the term. Thus, the learning processing 165 generates lexical associations to learn terminology.

The learning processing 165, during the accumulation phase, generates a lexical categorization schema based on the knowledge catalog 150. The categorization schema includes nodes of the knowledge catalog. The nodes correspond to the categories of the classification hierarchy that were classified for the terms in the accumulation phase. The contextual data specifies the number of documents that were classified to each node and a classification strength indicating the strength of the corresponding classification. The learning processing 165 analyzes the categorization schema to select the best node for the term. The learning processing 165, in an attempt to specifically define the term, selects a node in the lowest level of the classification hierarchy supported by the contextual data.

Figure 11:
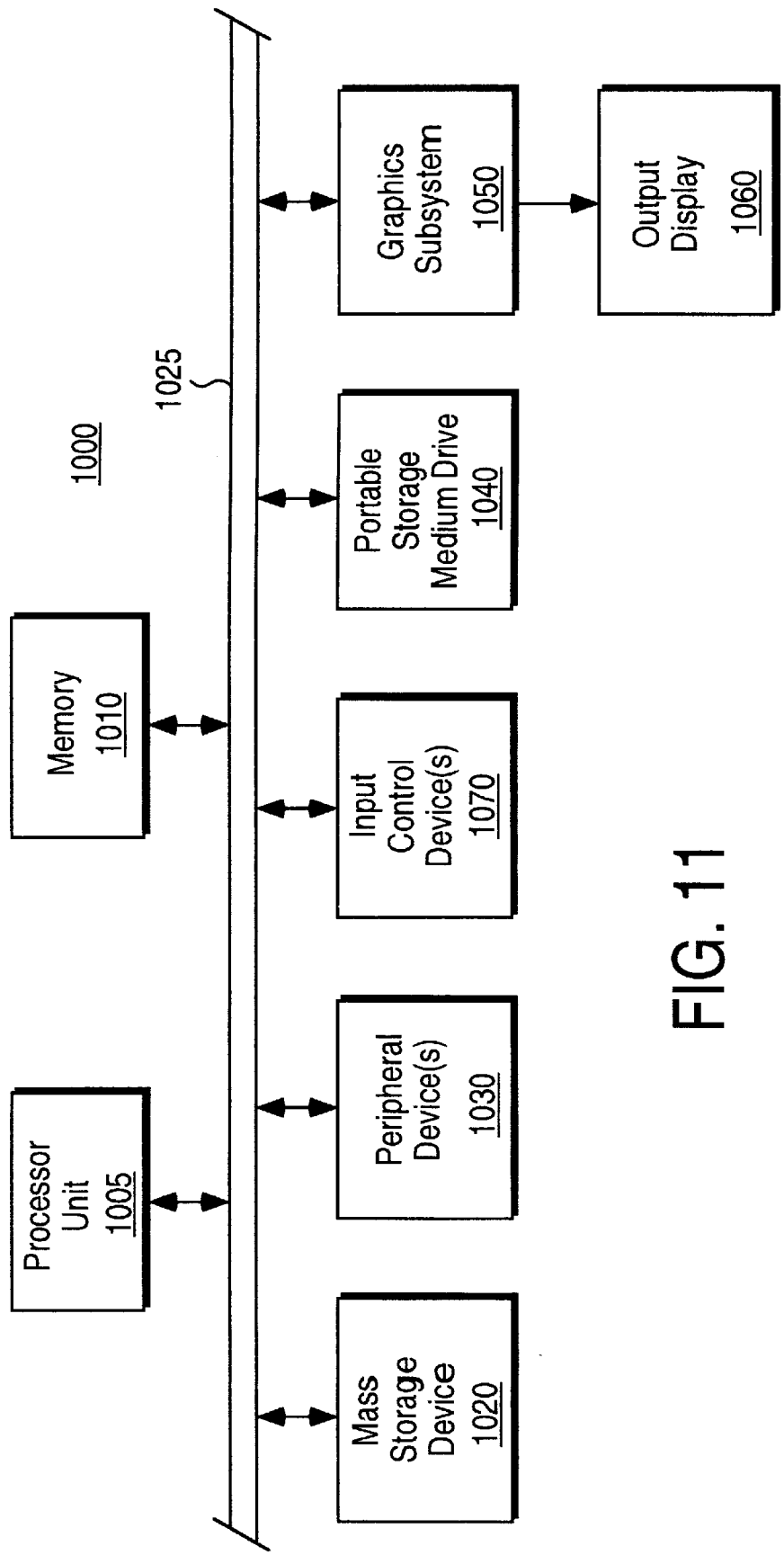
FIG. 11 illustrates a high level block diagram of a general purpose computer system in which the search and retrieval system of the present invention may be implemented.

Computer System:

FIG. 11 illustrates a high level block diagram of a general purpose computer system in which the search and retrieval system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the search and retrieval system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. or purposes of simplicity, all components in the computer system 1000 are shown in FIG. 11 as bing connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the search and retrieval system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the search and retrieval system software is stored on such a portable medium, and is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the search and retrieval system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The search and retrieval system may be implemented in either hardware or software. For the software implementation, the search and retrieval system is software that includes a plurality of computer executable instructions for implementation on a general purpose computer system. Prior to loading into a general purpose computer system, the search and retrieval system software may reside as encoded information on a computer readable medium, such as a magnetic floppy disk, magnetic tape, and compact disc read only memory (CD-ROM). In one hardware implementation, the search and retrieval system may comprise a dedicated processor including processor instructions for performing the functions described herein. Circuits may also be developed to perform the functions described herein. The knowledge catalog 150 and knowledge database 155 may be implemented as a database stored in memory for use by the search and retrieval system.

Although the present invention has been described in terms of specific exemplary embodiments, it will be appreciated that various modifications and alterations might be made by those skilled in the art without departing from the spirit and scope of the invention.

What is claimed is:

1. A method for processing a query in a search and retrieval system, said method comprising the steps of:

generating a plurality of point of view gists for at least one document, wherein each point of view gist comprises a synopsis of a corresponding document with a slant toward a topic, so that said plurality of point of view gists for a single document comprise synopses with slants toward a plurality of different topics;

processing a query, which includes at least one query term, to identify a plurality of topics related to said query; and selecting a plurality of point of view gists from one or more documents to generate, in response to said query, a new research document, wherein said point of view gists selected comprise synopses with slants toward said topics related to said query.

2. The method as set forth in claim 1, further comprising the steps of:

storing a plurality of themes for said documents, wherein said themes define an overall content for said documents;

selecting themes relevant to said query as said topics; and selecting documents that contain said themes selected.

3. The method as set forth in claim 2, wherein the step of storing themes for a document comprises the steps of:

processing a plurality of documents to identify said themes for a document; and classifying said documents, including themes identified for said documents, in categories so as to relate said themes to said categories.

4. The method as set forth in claim 3, wherein the step of generating a research document further comprises the step of inferring a response to said query by selecting point of view gists from documents that comprise common subject matter to generate said research document.

5. The method as set forth in claim 2, wherein the step of generating a research document further comprises the steps of:

selecting a first document comprising a first theme related to said query;

selecting at least one additional document that comprises said first theme and at least one additional theme related to said query; and selecting, to generate said research document, a point of view gist for said first document with a slant toward said first theme, and at least one point of view gist with a slant toward said additional theme.

6. The method as set forth in claim 1 further comprising the steps of:

storing a knowledge base that comprises a plurality categories;

storing document theme vectors that classify said documents and a plurality of themes identified for said documents in categories of said knowledge base;

mapping said query term to a category of said knowledge base;

selecting a plurality of documents classified for said category; and selecting themes for said documents as identified in said document theme vectors.

7. The method as set forth in claim 1, further comprising the steps of:

storing a knowledge base comprising a directed graph that links terminology having a lexical, semantic or usage association;

generating an expanded set of query terms through use of said knowledge base; and processing said query including utilizing said knowledge base to generate research documents relevant to said expanded set of query terms.

8. A method for processing a query in a search and retrieval system, said method comprising the steps of:

processing a query, which includes a plurality of query terms, to identify a plurality of topics related to said query;

selecting a plurality of documents relevant to said query; and generating, in response to said query, a new research document comprising portions of different documents of said documents selected, wherein each portion selected for said research document satisfies a different topic related to said query so as to infer a response to said query through use of multiple documents.

9. A computer readable medium comprising a plurality of instructions, which when executed by a computer, cause the computer to perform the steps of:

generating a plurality of point of view gists for at least one document, wherein each point of view gist comprises a synopsis of a corresponding document with a slant toward a topic, so that said plurality of point of view gists for a single document comprise synopses with slants toward a plurality of different topics;

processing a query, which includes at least one query term, to identify a plurality of topics related to said query; and selecting a plurality of point of view gists from one or more documents to generate, in response to said query, a new research document, wherein said point of view gists selected comprise synopses with slants toward said topics related to said query.

10. The computer readable medium as set forth in claim 9, further comprising the steps of:

storing a plurality of themes for said documents, wherein said themes define an overall content for said documents;

selecting themes relevant to said query as said topics; and selecting documents that contain said themes selected.

11. The computer readable medium as set forth in claim 10, wherein the step of storing themes for a document comprises the steps of:

processing a plurality of documents to identify said themes for a document; and classifying said documents, including themes identified for said documents, in categories so as to relate said themes to said categories.

12. The computer readable medium as set forth in claim 9, further comprising the steps of:

storing a knowledge base that comprises a plurality categories;

storing document theme vectors that classify said documents and a plurality of themes identified for said documents in categories of said knowledge base;

mapping said query term to a category of said knowledge base;

selecting a plurality of documents classified for said category; and selecting themes for said documents as identified in said document theme vectors.

13. The computer readable medium as set forth in claim 10, wherein the step of generating a research document further comprises the step of inferring a response to said query by selecting point of view gists from documents that comprise common subject matter to generate said research document.

14. The computer readable medium as set forth in claim 10, wherein the step of generating a research document further comprises the steps of:

selecting a first document comprising a first theme related to said query;

selecting at least one additional document that comprises said first theme and at least one additional theme related to said query; and selecting, to generate said research document, a point of view gist for said first document with a slant toward said first theme, and at least one point of view gist with a slant toward said additional theme.

15. The computer readable medium as set forth in claim 9, further comprising the steps of:

storing a knowledge base comprising a directed graph that links terminology having a lexical, semantic or usage association;

generating an expanded set of query terms through use of said knowledge base; and processing said query including utilizing said knowledge base to generate research documents relevant to said expanded set of query terms.

16. A computer readable medium comprising a plurality of instructions, which when executed by a computer, cause the computer to perform the steps of:

processing a query, which includes a plurality of query terms, to identify a plurality of topics related to said query;

selecting a plurality of documents relevant to said query; and generating, in response to said query, a new research document comprising portions of different documents of said documents selected, wherein each portion selected for said research document satisfies a different topic related to said query so as to infer a response to said query through use of multiple documents.

\* \* \* \* \*